Inventors,
Kurt Laas, &
Lothar Schmitt.
By [signature] Atty.

Inventors.
Kurt Laas &
Lothar Schmitt.
By [signature]
Atty.

Inventors.
Kurt Laas, &
Lothar Schmitt.
By [signature] Atty.

Inventors.
Kurt Laas &
Lothar Schmitt.
By [signature] Atty.

Inventors,
Kurt Laas, &
Lothar Schmitt.
By. [signature]
Atty.

Inventors.
Kurt Laas, &
Lothar Schmitt
By. [signature] Atty.

Inventors.
Kurt Laas, &
Lothar Schmidt.
By [signature] Atty.

Inventors.
Kurt Laas, &
Lothar Schmidt.
By [signature] Atty.

Inventors.
Kurt Laas, &
Lothar Schmitt.
By [signature] Atty.

3,144,516

CIRCUIT ARRANGEMENT FOR CONNECTORS CONTROLLED BY MARKERS COMMON THERETO

Kurt Laas, Munich, and Lothar Schmitt, Neuried, near Munich, Germany, assignors to Siemens & Halske Aktiengesellschaft Berlin and Munich, a corporation of Germany Filed Mar. 6, 1959, Ser. No. 797,813
Claims priority, application Germany Mar. 10, 1958
22 Claims. (Cl. 179—18)

Figure 1A:
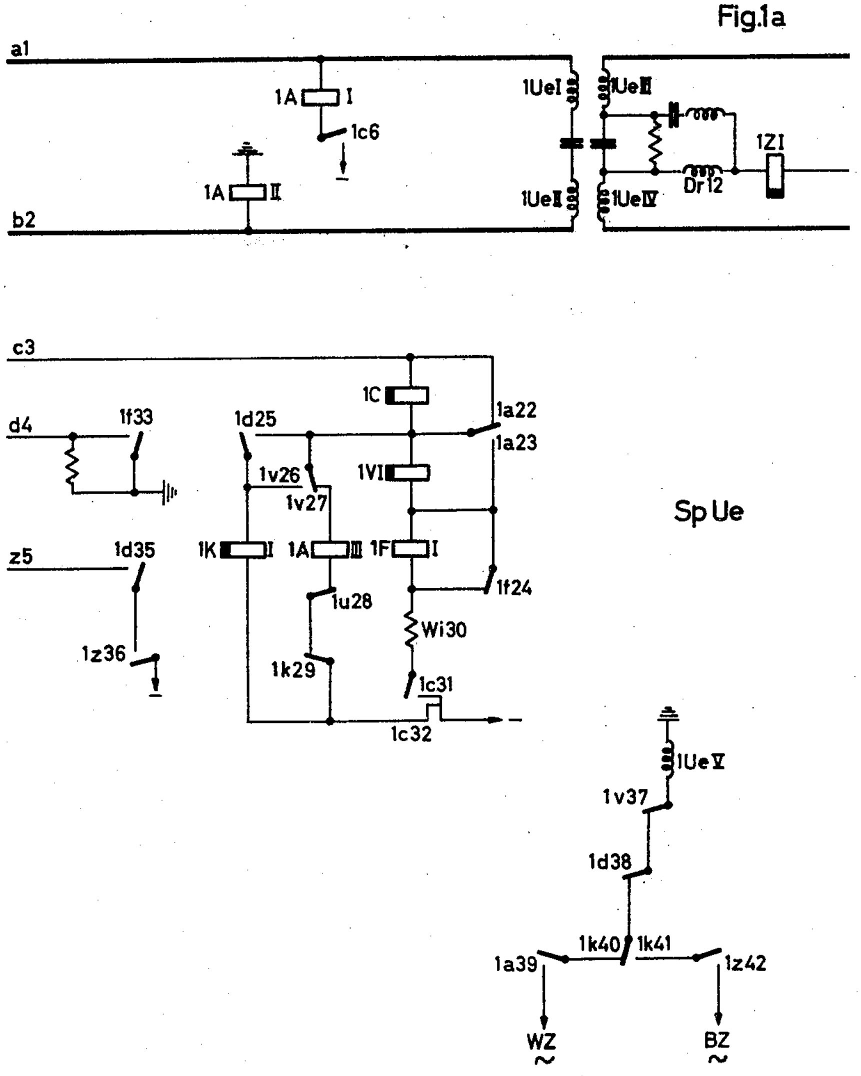

This invention is concerned with connectors employed in communication systems, especially telephone systems, comprising marker devices which are respectively common to a plurality of connectors, whereby the operations of an associated connector are controlled to establish connection with a called subscriber station depending upon impulse series transmitted from a calling subscriber station. The marker thus used in extending a connection is released after the setting of the corresponding connector responsive to the first (tens) impulse series, which serves for the setting of the connector to the desired decade, and is thereby made available for another call. A marker is however again taken into use for controlling the connector in accordance with the last (units) impulse series so as to effect setting thereof to the bank contacts of the desired called station. In such a telephone system, the impulse series transmitted from a calling station are stored in a storer which is provided in a battery feed circuit at the incoming end of a connection.

The object of the invention, applied in such systems wherein the marker is disconnected from a connector between the transmission of the tens and units impulse series (digits), is to avoid transmission of a particular criterion from the battery feed circuit to the marker while nevertheless assuring proper operation, that is, avoiding erroneous decade marking by the marker responsive to receipt of the units digit.

The invention avoids the transmission from the battery feed circuit allotted to the calling station, of a particular criterion for the marking of the units impulse series, by transmitting to a relay set (battery feed set) allotted to the conector, after the first connection of the marker thereto, a criterion which is to be stored, such criterion being operative to prevent upon the second connection of the marker renewed decade setting of the connector responsive to the units digit.

The invention makes it possible to provide a further group selection stage between the connector and the relay set allotted thereto, hereinafter referred to as battery feed circuit, thereby achieving a reduction in the number of battery feed circuits allotted to the connectors.

The transmission to the battery feed circuit allotted to a connector, of a criterion for preventing renewed decade marking responsive to the units digit, may be effected prior to or after receipt of the tens digit which marks the decade.

When the marking of the decade (tens digit) and the marking of bank contacts of the individual line (units digit) is effected over contacts of a relay chain which receives the tens and units digits, according to the invention, after receipt of the tens digit, a circuit is closed to the battery feed circuit for the storing of the criterion marking the effected decade setting.

In accordance with a further feature of the invention, there is effected simultaneously with the storing of the decade selection in the battery feed circuit allotted to the connector, the marking of the marking steps disposed ahead of the individual decades. In accordance with the invention, a switch-over relay energizes in the marker simultaneously with a relay in the battery feed circuit which stores the decade selection, such relay being operative to connect by way of its contacts the outlets of a contact pyramid formed by a relay counting chain with the marking steps or positions arranged ahead of the decades. This switch-over relay does not energize responsive to the receipt of the units digit impulse series and a second switch-over relay is therefore energized responsive to release of a relay which is actuated during the receipt of the impulse series, such second switch-over relay being operative to switch the outlets of the contact pyramid to the bank contacts of the individual lines arranged within the respective decades. In order to avoid provision with ten decades of ten contacts for each switch-over relay, only part of the outlets of the contact pyramid is in accordance with the invention switched to marking steps by the contacts of the first switch-over relay, while the other outlets are connected with the corresponding marking steps over normal or resting contacts of the second switch-over relay. Accordingly, upon transmission of the units digit, again only part of the outlets of the contact pyramid is over the contacts of the second switch-over relay switched to the bank contacts of the individual lines in the respective decades, while the remaining outlets are already connected with the corresponding individual lines over the resting or normal contacts of the first switch-over relay.

However, if the switch is after the decade setting thereof set on the bank contacts of the desired called line directly by the incoming impulses of the units digit, instead of being set by the marking of the corresponding bank contacts, a testing circuit is in accordance with the invention closed to the battery feed circuit of the connector, after seizure of a mark and prior to the receipt of an impulse series, to ascertain whether or not the decade setting has been stored.

In accordance with another feature of the invention, the switching means for the control of the operations of the switching connection with the setting of the wipers on bank contacts of individual lines or for the control of the relay counting chain in connection with the decade marking, are placed under the influence of the current impulse receiving relay, depending upon whether the decade setting has or has not been effected.

The storing of the criterion in the preceding battery feed circuits, incident to the decade marking and the individual line setting, is suitably effected not after receipt of the tens digit and consequent decade selection, but simultaneously with the testing over the testing circuit completed upon seizure of the marker. The wiring of all individual outlets of the decades with the marker is in the individual line setting avoided.

Figure 1B:
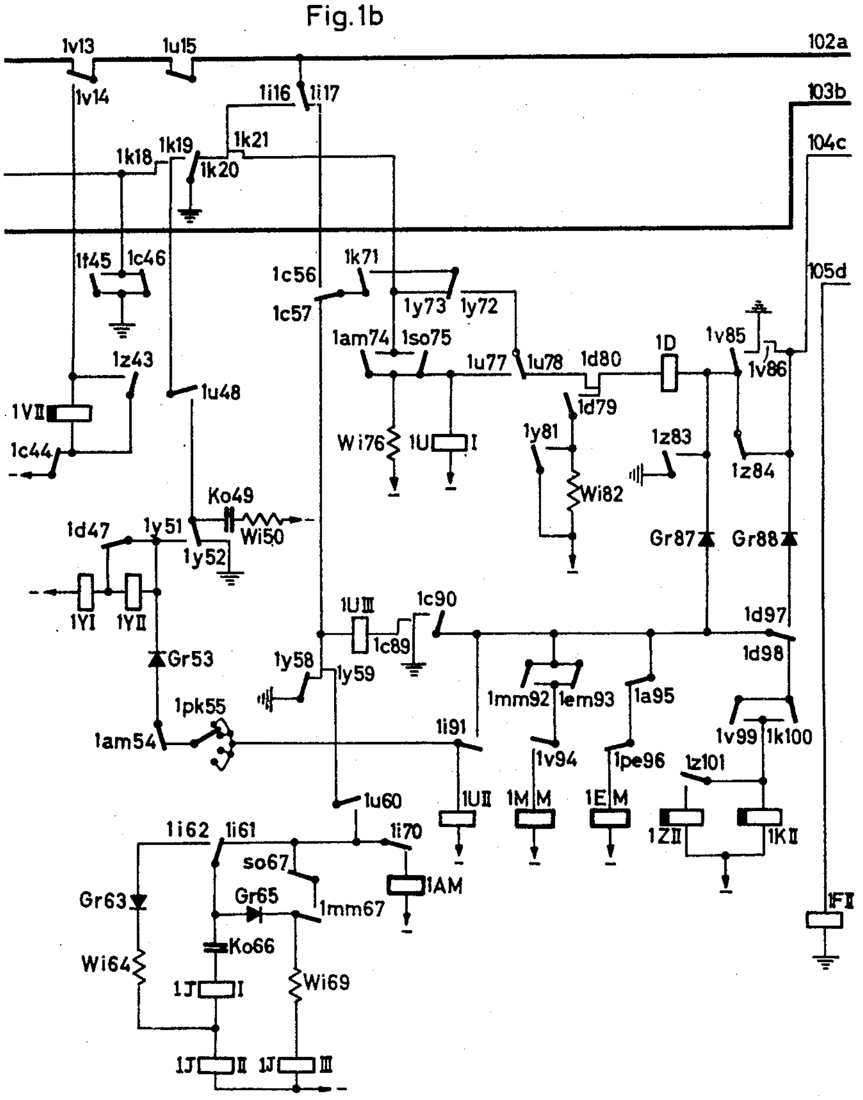
Figure 2A:
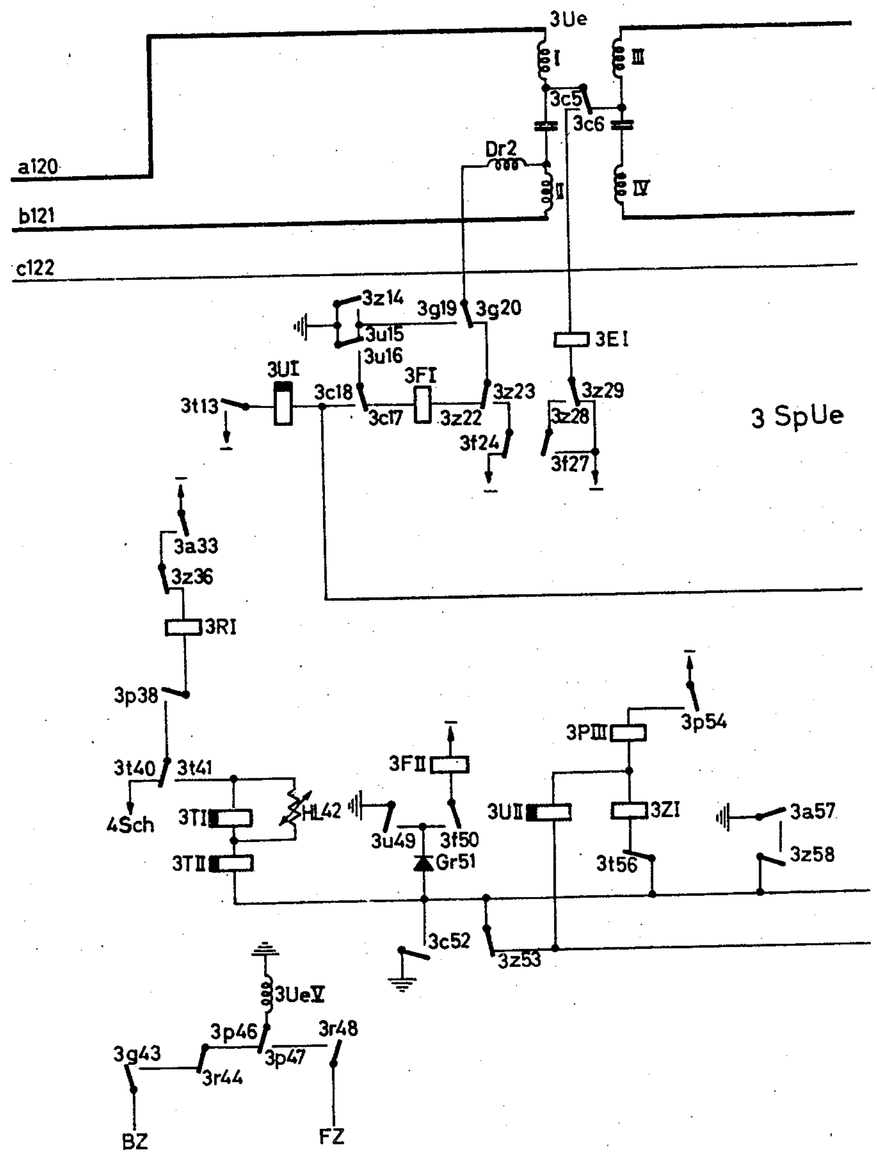
Figure 2B:
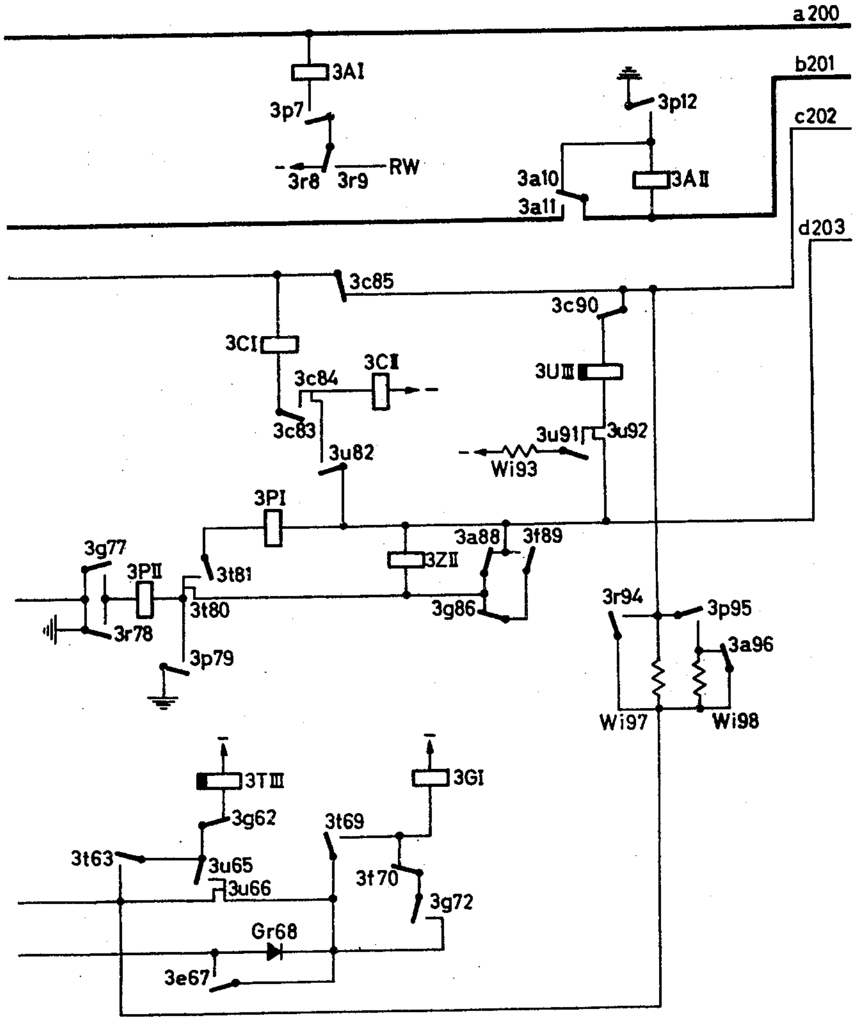
Figure 3A:
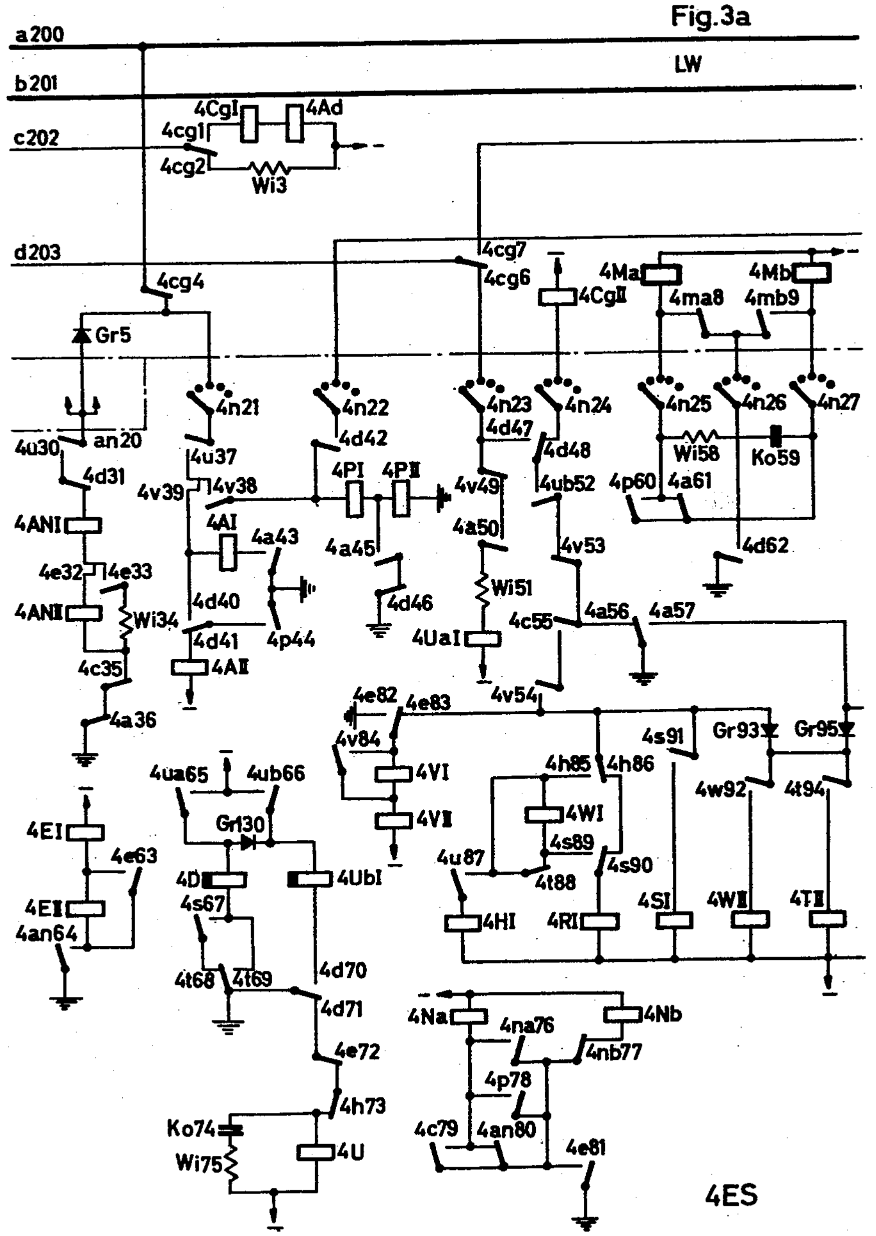
Figure 3B:
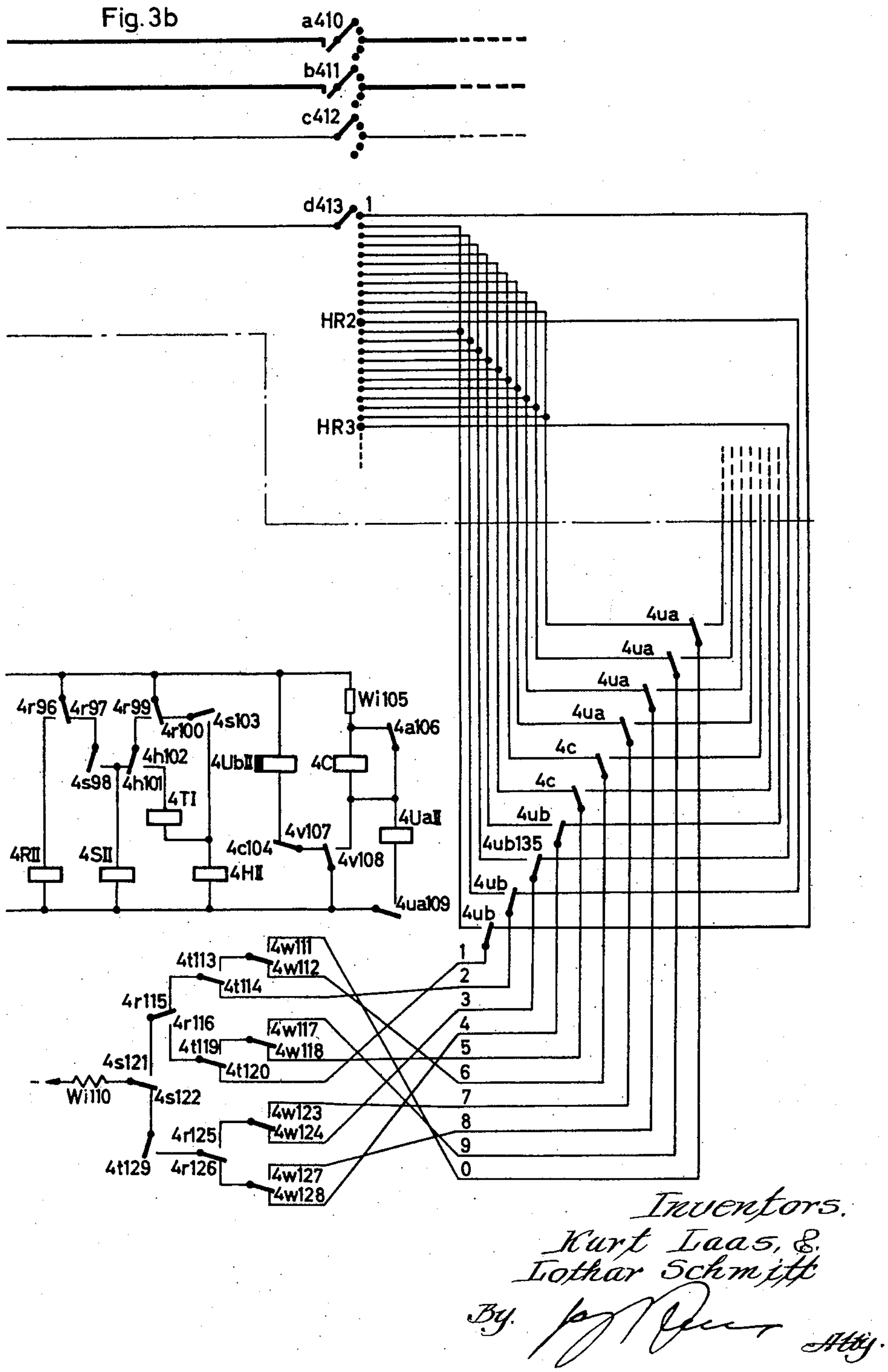
Figure 4A:
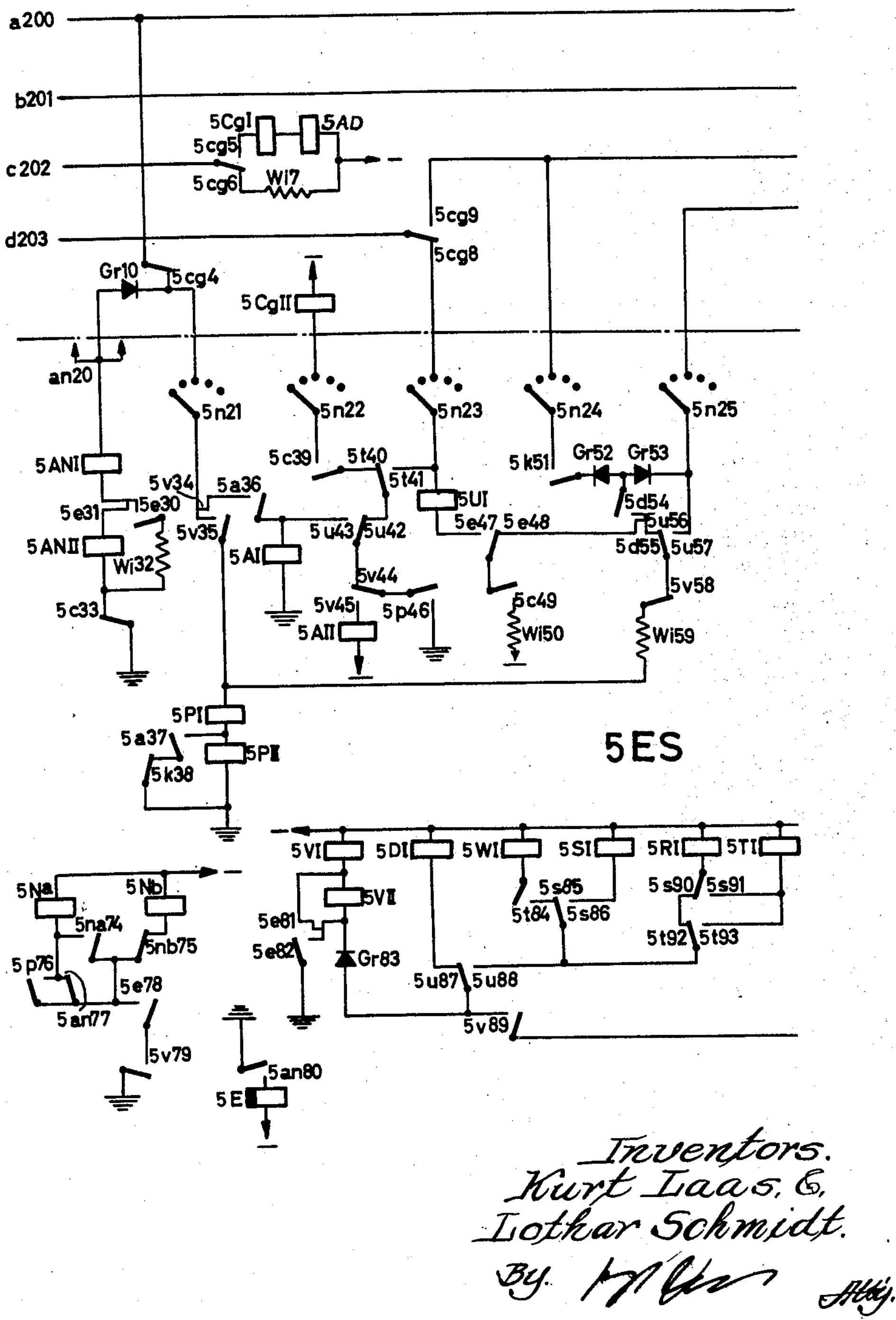
Figure 4B:
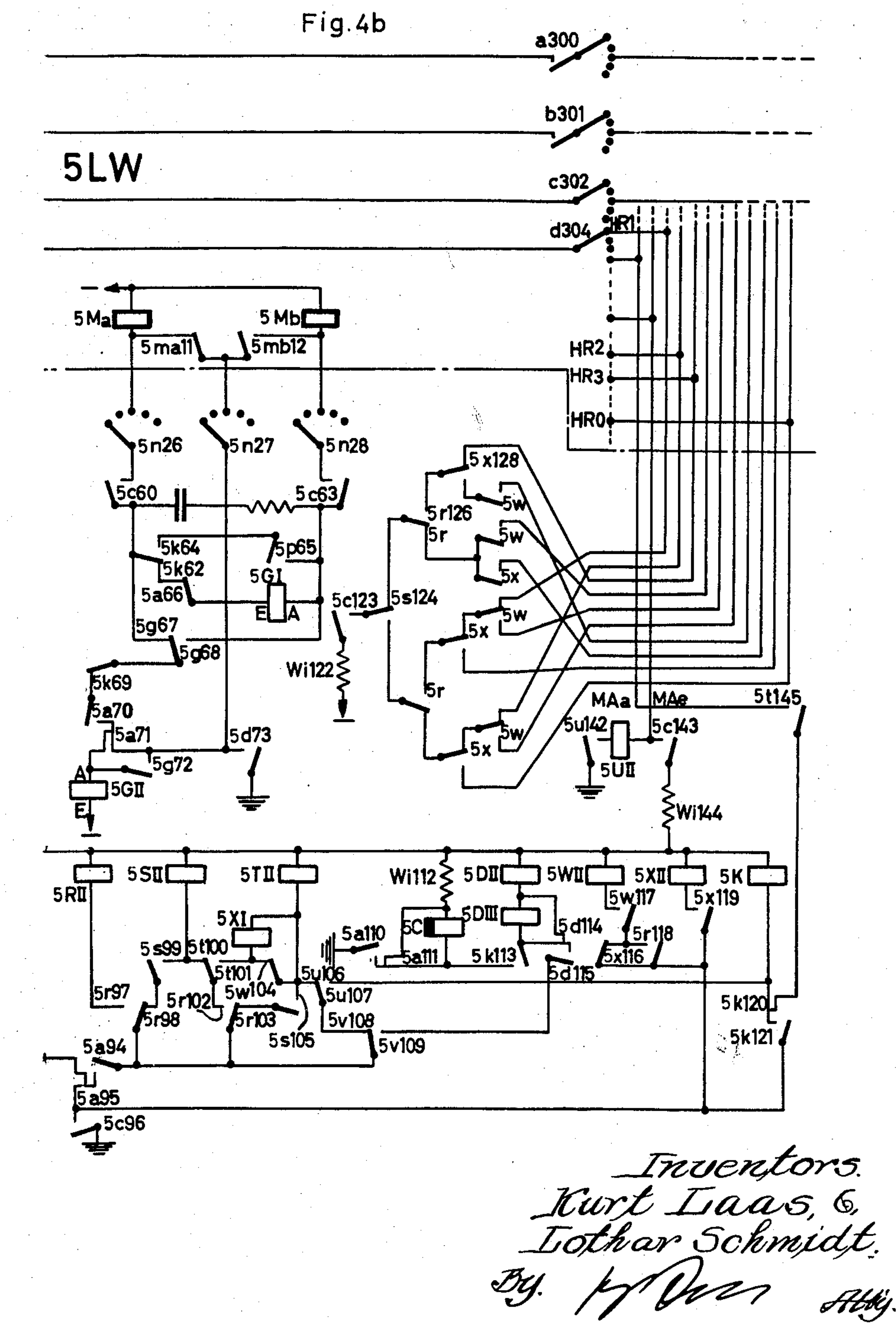
Figure 5:
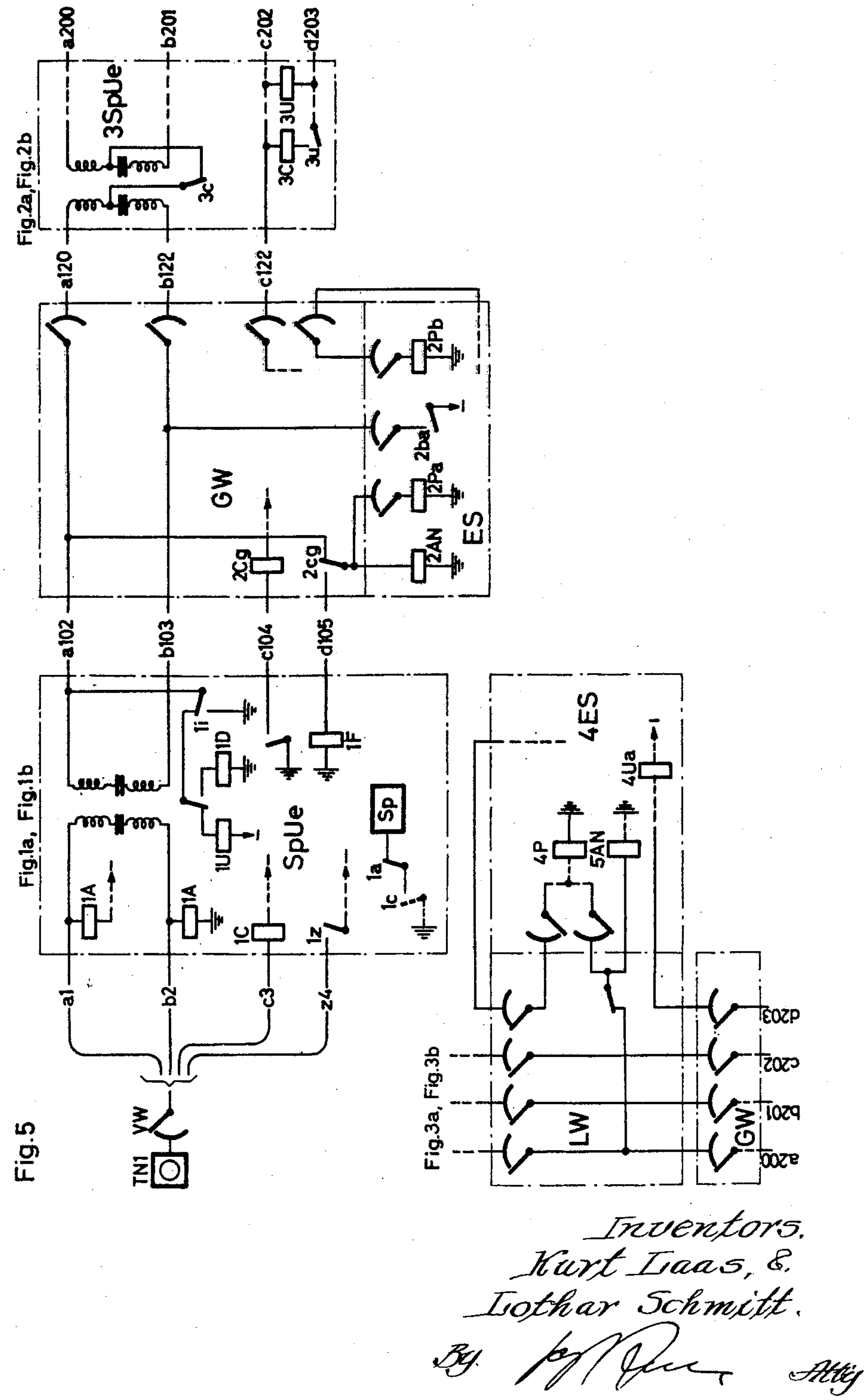

The various objects and features of the invention will appear in the course of the description which will be rendered below with reference to the accompanying drawings, showing two embodiments of the invention as applied to a telephone system comprising switches controlled by markers which are respectively common to a plurality of switches. In the drawings:

FIGS. 1*a* and 1*b* illustrate the storing device provided in connection with such a system, such storing device being arranged in the battery feed transmission for the calling subscriber;

FIGS. 2*a* and 2*b* show the battery feed transmission for the called subscriber including also the testing means for the testing of a called line reached by a connector;

FIGS. 3*a*, 3*b* and 4*a*, 4*b* respectively show an embodiment of a connector and a marker which is common to a plurality of connectors; and FIG. 5 shows an overall circuit of a telephone system in which the invention is incorporated.

The operation of the system, details of which are shown in FIGS. 1*a* to 4*b*, will now be described with reference to FIG. 5.

The individual subscriber stations, such as, for example, station TN1 are connected to bank contacts of a call finder VW which is directly connected with a battery feed circuit S*p*U*e*. As soon as a subscriber removes his receiver, a call finder starts to operate and establishes connection with such subscriber to extend the calling line to the battery feed circuit. The current impulse series transmitted by the calling subscriber by impulse interruption of the line loop cause impulse actuation of the line relay 1A which transmits the impulses to the storer S*p*. Upon receipt of the first impulse, voltage is placed on the outgoing conductor *a*102, causing energization of the start relay 2AN in the setting or control set ES which is common to a plurality of group selectors GW, such start relay 2AN starting operation of the connecting switch of the marker, the connecting switch establishing connection with the group selector which is connected with the battery circuit. When the connecting switch reaches this group selector, the test relay 2P*a* will be energized, thereby effecting restoration of the high resistance start relay 2AN. The current flowing over the conductor *a*102 is at the same time increased, thereby causing energization of relay 1U which is disposed in the battery feed circuit and which is operative to initiate the transmission of the current impulses stored in the storer S*p*. Responsive to each current impulse, voltage is disconnected from the *a*102-conductor, thereby causing restoration of the testing relay 2P*a* in the marker of the group selector. The impulse operation of the testing relay effects impulse switching of a relay chain for marking the decade in accordance with the corresponding impulse series. As soon as the first current impulse series is transmitted from the storer, the group selector is actuated and sets its wipers in engagement with an idle contact of the designated decade. When this contact is reached, the testing relay 2P*b* is energized, stopping further actuation of the group selector wipers and initiating disconnection of the marker. As soon as the control set is disconnected, ground is disconnected from the *a*102-conductor, thereby causing restoration of relay 1U in the battery feed circuit. During the delayed release of the relay 1Y, shown in FIG. 1*b*, a test is made to ascertain whether the connection is to be extended to another exchange, requiring transmission over the *a*-conductor of current impulse series in the form of ground impulses, or is to remain in the same exchange. If the latter is the case, no particular switching operations are effected and after restoration of the relay 1Y (FIG. 1*b*), voltage is again connected by way of relay 1U to the *a*102-conductor, so as to effect energization of the start relay 5AN of the marker 5ES (FIG. 4), which is common to a plurality of connectors. Thereupon, as soon as the connecting switch of the marker 5ES has reached the connector 5LW, relay 1U is again energized and the next following current impulse series will be released.

However, if the call is to be extended to another exchange to which the current impulses are to be transmitted over the *a*-conductor in the form of ground impulses, voltage is connected by such other exchange, to the *a*102-conductor and relay 1D in the battery feed circuit is energized. Switching operations are thereby effected in the battery feed circuit, as will be presently described more in detail with reference to FIGS 1*a* and 1*b*, so as to transmit the successive current impulses as ground impulses over the *a*-conductor.

After the current impulse series, which designates the decade in the connector, has been received in the marker 5ES, switch-over relay 3U in the battery feed circuit 3S*p*U*e* and switch-over relay 5U in the marker 5ES of the connector will be energized by way of the conductor *d*203. Relay 3U in the battery circuit completes a holding circuit for itself opening at the same time the energizing circuit. Relay 5U in the marker of the connector will also be held in a holding circuit completed thereby. The energization of relay 3U in the battery feed circuit serves at the same time as a signal for releasing the connector for the decade selection. Relay 3U also actuates contact 3*u* for preparing a circuit for the energization of the private or seizure relay 3C. However, seizure relay 3C cannot energize at this time for lack of potential on the conductor *d*203 in the marker of the connector.

When the connector has reached the designated decade, the testing relay 5P will be energized and disconnection of the ground potential in the control set of the connector will be initiated. Relay 1U in the battery feed circuit S*p*U*e* is thereby caused to restore, effecting delayed release of relay 1Y (FIG. 1*b*). Upon release of relay 1Y, voltage is by way of relay 1U again placed on conductor *a*102, signifying that the marker of the connector is needed again. The setting set of the connector had been released responsive to energization of the testing relay 5P. When the connector reaches the marked step of the selected decade, the testing relay 5P will again energize and stop further operation of the connector. Depending upon the energization of the testing relay 5P, the seizure relay 3C of the battery feed circuit 3S*p*U*e* will be caused to energize. The seizure relay 3C now connects the testing circuit for the testing of the called subscriber's line. Moreover, if the called line is idle, ringing current will be placed on the line conductors extending to the called line. The calling subscriber receives at the same time the ringing tone. However, if the called line is busy, busy tone will be transmitted to the calling subscriber as a signal that he should replace the receiver, whereupon the connection is released.

A further group selector, for example, in larger exchanges, a fourth group selector, may be disposed between the battery feed circuit 3S*p*U*e* and the connector LW. The line conductors and the control or private conductors of such group selector are directly connected through and the switching operations accordingly correspond to those already described.

FIGS. 1*a* and 1*b* show the battery feed circuit for the calling subscriber and the storage device for storing and repeating the train of pulses transmitted by the subscriber. An example of the storage device or impulse repeater is described in U.S. Patent No. 2,737,648 which is owned by the assignee named in the present application. The storage device comprises a circular-disc with metal lamellas arranged peripherally thereof, such disc being stepped forward step by step by the impulses transmitted by the calling subscriber, thereby storing the impulses. A guide ring of insulating material is arranged about the lamellas, the inner diameter of such guide ring being smaller than the outer diameter of the lamella disc. The lamella disc which is described in the above-mentioned patent, is shown in FIG. 1*b* merely symbolically by a number of dots interconnected by an arcuate line, in a manner similar to the schematic illustration commonly used for contact banks of rotary switches, the dots indicating contact points which are scanned by the wiper 1*pk*55. A marking magnet which is shown in FIG. 1*b* just like all other magnets, by a symbol commonly used for magnets, is energized after the first impulse to the last impulse of each current impulse series, such magnet pressing the lamellas, beginning with the second impulse of each impulse series, underneath the guide ring, while the lamella, which corresponds to the first impulse of an impulse series remains above said guide ring, thereby signifying the end of an impulse series. When an impulse series is released by the storage device, the scanning wiper 1*pk*55 (FIG. 1*b*), is by means of a release magnet rotated step by step in a direction opposite to the rotation of the disc, thereby encountering the lamella above the guide ring and closing the circuit of a relay which indicates the end of an impulse series; the wiper is briefly stopped and thereafter rotates again until it reaches its normal position. The lamella disc does not return to normal position but remains in the position reached by the last stored impulse. A cam disc rotates with the scanning wiper, such cam disc operating off-normal contacts *so*67, 1*so*75, when the wiper leaves its normal position, and when reaching its end position, contact 1*pe*96 is actuated, signifying thereby "the storage device is filled." This end position contact interrupts the further reception of incoming impulses. As the details of the storage device do not form a part of the present invention, the scanning wiper 1*pk*55 and associated contacts are merely schematically illustrated.

The device shown in FIGS. 1*a* and 1*b* is seized by the preceding connecting device, a call-finder, via the private conductor *c*3 as follows:

(1)
+, . . ., *c*3-wire, 1*a*22, 1*v*27, 1AIII, 1*u*28, 1*k*29, 1*c*32, —.

As a result the relay 1A is attracted and by opening its contact 1*a*22 opens the short circuit for the seizure relay 1C which is thereby inserted in the circuit 1) and energizes. Furthermore, the winding V of the transformer 1U*e* (right hand bottom of FIG. 1*a*) is connected via contact 1*a*39 to the dial tone WZ:

(2) +, 1U*e*V, 1*v*37, 1*d*38, 1*k*40, 1*a*39, WZ.

The dial tone is transmitted inductively from the winding 1U*e*V to the windings 1U*e*I and 1U*e*II of the transformer and transmitted via the line conductors *a*1 and *b*2 to the calling subscriber. After energization of relay 1C the energization circuit for the winding III of relay (1AIII) is interrupted. Relay 1A is however held via its winding I and II and the subscriber loop in the following circuit:

(3)
+, 1AII, *b*2-wire, subscriber loop, *a*1-wire, 1AI, 1*c*6, —.

Via contact 1*c*90 (about center of FIG. 1*b*), ground potential is applied to the private conductor 104*c* leading to the successive connecting device:

(4) +, 1*c*90, G*r*87, 1*z*84, 104*c* conductor, . . . .

Responsive to the dial tone, the calling subscriber now transmits by means of his dial the first series of impulses which, let us say, consists of six impulses. In the battery feed circuit, the impulse receiving relay 1A deenergizes in a pulse-like manner. Upon the first deenergization of the relay 1A, due to the opening of the contact 1*a*23, relay 1V is connected via its winding I:

(5) +, . . ., *c*3-wire, 1*a*22, 1VI, 1*f*24, W*i*30, 1*c*31, —.

By closing the contact 1*a*22, the seizure relay 1C is short-circuited, but is nevertheless held for a series of impulses, due to its delay in deenergizing. The seizure relay 1C, after the cutting off of its energizing circuit, had been held in the following circuit:

(6) +, . . ., *c*3-wire, 1C, 1*a*23, 1*f*24, W*i*30, 1*c*31, —.

After energization of the relay V (winding 1VI) its contact 1*v*99 (bottom right of FIG. 1*b*) is closed to energize the relay 1K which relay is held via its contact 1*k*100, independently of contact 1*v*99 in the following circuit:

(7) +, 1*c*90, 1*d*98, 1*k*100, 1KII, —.

Furthermore, upon energization of relay 1K the dial tone is disconnected by the opening of the contact 1*k*40 (bottom right of FIG. 1*a*) and preparation is made for the transmission of a busy signal BZ by the closing of the contact 1*k*41.

Upon the deenergization of the relay 1A, the storage magnet 1EM (bottom right of FIG. 1*b*) of the storage device is energized via contact 1*a*95 in the following circuit:

(8) +, 1*c*90, 1*a*95, 1*pe*96, 1EM, —.

The storage magnet 1EM is attracted and after energization of the relay A, the EM magnet which deenergizes shifts the laminations one step further. The off-normal contacts are thereby actuated. Negative potentials lies, via contact 1*so*75 (FIG. 1*b*; center below the line conductors) in the following circuit on the outgoing line conductor *a*102:

(9) $-, \frac{1UI}{Wi76}$, 1*so*75, 1*y*73, 1*k*71, 1*c*56, 1*i*17, 102*a* connuctor, . . .

By the application of this voltage to the *a*102 conductor a marker associated with the succeeding connecting device is excited. The relay 1U (winding 1UI; FIG. 1*b*) receives current insufficient to effect its operation while the individual set is being seized and can therefore not be attracted. At the end of the first impulse, the pulse receiving relay 1A (FIG. 1*a*) is again attracted and by opening its contact 1*a*22, again connects the seizure relay 1C (cf. circuit 6) and, via its contact 1*a*23, short-circuits the relay IV which, however, due to its delayed deenergization, remains energized during a series of pulses. Furthermore, by the opening of the contact 1*a*95 (FIG. 1*b*; bottom right), the storage magnet 1EM is disconnected, which magnet, after deenergizing, energizes the marker magnet 1MM via contact 1*em*93:

(10) +, 1*c*90, 1*em*93, 1*v*94, 1MM, —.

The second lamella is thus pushed by the marking magnet 1MM underneath the previously mentioned guide ring and thereafter the four following lamellas are pushed underneath the guide ring by the following impulses. After the sixth impulse, the relay 1A remains energized, so that the relay 1V releases with time delay due to the winding I thereof being short circuited by contact 1*a*23. After release of the relay 1V, the marking magnet 1MM is deenergized by the opening of the contact 1*v*94. The further current impulse series are received and respectively stored and released by the storage device in the above described manner.

As soon as one marker seizes the succeeding connecting device, the high resistance starting relay of such marker device, which is connected to the 102*a* conductor, is disconnected and via the low resistance test relay which is now connected, an amplification of current is obtained so that the relay 1U in the storage device can energize via its winding I in accordance with circuit 9. Via contact 1*u*60 the storage release magnet 1AM (bottom of FIG. 1*b*) and the pulse transmitting relay 1J are energized in the following circuits:

(11) +, 1*y*58, 1*y*59, 1*u*60, 1*i*70, 1AM, —;
(12) +, 1*y*58, 1*y*59, 1*u*60, 1*i*61, G*r*65, W*i*69, 1JIII, —.

The relay 1J can however not be actuated since it is oppositely energized over its windings I and II by the charging current for the capacitor K*o*66:

(13) +, 1*y*58, 1*y*59, 1*u*60, 1*i*61, K*o*66, 1JI, 1JII, —.

As soon as the capacitor K*o*66 is charged, relay 1J is actuated over its winding III and holds itself, due to the discharge current K*o*66 in the following circuit:

(14) +, (K*o*66), G*r*65, W*i*69, 1JIII, 1JII, 1JI, — (K*o*66).

The capacitor further discharges in the following circuit:

(15) +, (K*o*66), 1*i*62, G*r*63, W*i*64, 1JI, — (K*o*66).

During the time of actuation of the relay 1J, voltage is disconnected from the *a*102 conductor by the opening of the contact 1*i*17 (see circuit 9) and a pulse is thus transmitted to the marker. Furthermore, by the opening of the contact 1*i*70, the storage release magnet 1A*m* is disconnected, which magnet, after it has deenergized, prepares a test circuit for the test wiper *pk*55 of the storer selector by closing the contact 1*am*54:

(16) +, 1*c*90, 1*i*91, 1*pk*55, 1*am*54, G*r*53, 1*d*47, 1YI, —.

Since the second lamination is underneath the guide ring, this circuit is open, so that relay 1Y cannot energize. After the discharge of the capacitor K*o*66, relay 1J deenergizes and by closing its contact 1*i*17 (top of FIG.

1b) again applies voltage to the 102a conductor (cf. circuit 9). Over contact 1i70 (bottom of FIG. 1b), the storage release magnet 1Am is again energized and the charging circuit for the capacitor Ko66 is again closed via contact 1i61. During the time in which relay 1J was energized, relay 1U was held over its winding II (bottom center of FIG. 1b) in the following circuit since the holding circuit for winding I was interrupted by the opening of the contact 1i17:

(17) +, 1c90, 1i91, 1UII, —.

During the transmission of the sixth pulse, the test wiper pk55 (near bottom left of FIG. 1b) is on the lamination located above the guide ring so that the energizing circuit for the relay 1Y (see circuit 16) is closed after the deenergization of the storage release magnet 1AM. Relay 1Y actuates and holds itself, independently of its holding circuit, in the following circuit:

(18) +, 1k19, 1u48, 1y51, 1d47, 1YI, —.

By opening of contact 1y58 and 1y59, ground potential is removed from the pulse transmitting relay 1J and the storage release relay 1AM so that they can no longer energize. Via contact 1y72, relay 1U is held over its winding I in the following circuit:

(19) +, . . ., 102a-wire, 1i17, 1c56, 1k71, 1y72, 1u77, 1UI, —.

After setting of the succeeding first group selector to an idle outgoing line, ground potential is disconnected from the 102a conductor so that relay 1U deenergizes. After the deenergization of relay 1U, the holding circuit for relay 1y (cf. circuit 18) is interrupted by the opening of the contact 1u48, but relay 1Y is held by the discharge current of the capacitor Ko49:

(20) + (Ko49), 1y51, 1d47, 1yI (minus line), Wi59, —(Ko49).

Furthermore, relay 1D is via contact 1u78 connected to the 102a conductor in the following circuit:

(21) +, 1c90, Gr87, 1D, 1d80, 1u78, 1y72, 1k71, 1c56, 1i17, 102a conductor, . . .

If the group selector has been set, by the series of transmitted pulses, to an outgoing connecting device which operates in accordance with the same technique as described (pulse-wise interruption of the voltage), no voltage is present in such connecting on the 102a conductor and relay 1D cannot energize. If there is concerned, however, a connecting device which is set by ground current pulses, negative voltage will be on the 102a conductor and relay 1D energizes.

By opening contact 1d38 (bottom right in FIG. 1a), the preparatorily connected busy signal BZ is interrupted. Relay 1D maintains itself independently of the energizing circuit in the following holding circuit:

(22) +, 1c90, Gr87, 1D, 1d79, 1y81, —.

By opening contact 1d47, the short-circuit for the winding II of the relay 1Y is interrupted, so that the relay 1Y deenergizes after discharge of the capacitor Ko49. Furthermore, by opening contact 1d98, relay 1K is disconnected (cf. circuit 7). After the deenergization of relay 1K, relay 1U is over the contacts 1k20 and 1k21 of relay 1K energized in the following circuit:

(23) +, 1k20, 1k21, 1so75, $\frac{1U1}{Wi76}$, —.

Via contact 1u60, the storage release magnet 1AM (cf. current path 11) is energized, and the pulse transmitting relay 1J is connected (cf. circuits 12 to 15). As soon as the wiper 1pk55 has reached the next marked lamination, relay 1Y energizes (cf. circuit 16) and interrupts the further transmission of pulses. Relay 1Y is held by the discharge current of the capacitor Ko49 (cf. circuit 20) and deenergizes with considerable delay after discharge of the capacitor Ko49 over windings 1YI and 1YII. The closing of contacts 1y58 and 1y59 initiates the transmission of the next series of pulses.

(24) +, 1k20, 1i16, 102a-conductor, . . .

During the time of energization of the pulse transmitting relay 1J, a ground pulse is transmitted in each case over the 102a conductor, by the application of ground:

After the transmission of all series of pulses relay 1U is disconnected by the opening of contact 1so75.

If the relay 1D does not operate, relay 1Y deenergizes and over its contact 1y73 connects voltage to the 102a conductor (cf. circuit 9) so as to obtain a marker of the connecting device which has been reached. After connection of a marker, the storage release of the series of pulses is initiated as already described. When all digits have been released from the storage device, the contact 1so75 of the pulse repeater is interrupted and thus the start circuit for further markers is interrupted.

If the selector arranged in the succeeding trunk device does not find any idle outgoing connecting line, then after the stopping of the selector at a full-rotation step, voltage is applied to the 103b conductor. The metering relay 1Z (FIG. 1a) is thereby energized over its winding I:

(25) +, 1k19, 1k18, 1ZI, Dr. 12, 1UeIV, 103b-conductor, . . . —.

By the opening of the contact 1z84, ground potential is removed from the 104c conductor (cf. circuit 4) and the succeeding connecting device is thereby released. Relay 1Z holds itself, independently of its energizing circuit, via its winding II (1ZII, bottom right in FIG. 1b) in the following circuit:

(26) +, 1c90, 1d98, 1k100, 1z101, 1ZII, —.

By closing the contact 1z42 (bottom right in FIG. 1a), a busy signal BZ is connected to the winding 1UeV of the transformer 1Ue:

(27) +, 1UeV, 1v37, 1d38, 1k41, 1z42, busy signal BZ.

From winding V, busy tone is transmitted to the calling subscriber via the windings I and II of the transformer 1Ue. The busy signal causes the calling subscriber to release the seized connecting device by replacing the receiver.

Furthermore, when the selector stops at the full rotation step, the holding circuit for relay 1U (cf. circuit 19) is interrupted. After release of relay 1U, the holding circuit for relay 1Y (cf. circuit 18) is opened by the opening of contact 1u48, relay 1Y however holding itself until the discharge of the capacitor Ko49 in accordance with circuit 20.

As soon as the calling subscriber has replaced his receiver, the holding circuit for windings I and II of relay 1A (cf. circuit 3) is interrupted. Relay 1A deenergizes and via its contact 1a22 short circuits the winding of the seizure relay 1C (FIG. 1a) which is thereby caused to deenergize with delay. During the restoring time of relay 1C, relay 1V can energize in accordance with circuit 5. Furthermore, the closure of contact 1a95 connects the storage magnet 1EM in accordance with the circuit 8. As soon as relay IV is energized and the seizure relay 1C has restored, relay 1K is held independently of the holding circuit via its winding II (cf. circuit 7) via its winding I:

(28) +, . . ., c3-conductor, 1a22, 1v26, 1K1, 1c32, —.

After the delayed release of the seizure relay 1C, the holding circuit for relay IV is interrupted by the opening of the contact 1c31 so that relay IV deenergizes. Furthermore, by the opening of contact 1c90, relay 1Z and the storage magnet 1Em are disconnected. By the closure of contact 1c57, relay 1U is energized via its winding I in the following circuit:

(29) +, 1y58, 1c57, 1k71, 1y73, 1so75 $\frac{1UI}{Wi76}$, —.

Relay 1U actuates and closes over its contact 1u60 circuit 11 for energizing the storage release magnet 1AM and the circuits 12 and 13 for the pulse transmitting relay 1J. Relay 1J actuates, after the capacitor Ko66 has been charged and holds itself until discharge of this capacitor in accordance with circuits 14 and 15. In the meantime, relay IV releases and by opening the contact 1v26, interrupts the holding circuit for relay 1K (cf. circuit 28). After the delayed release of relay 1K, relay 1U is held in the following circuit instead of circuit 29:

(30) +, 1k20, 1k21, 1so75, $\frac{1UI}{Wi76}$, —.

Upon actuation of relay 1J, the storage release magnet 1A*m* is disconnected by the opening of contact 1i70. As soon as relay 1J releases after the discharge of the capacitor Ko66, the charging circuit for this capacitor is again closed by the closing of contact 1i61 and the storage release magnet 1AM is again connected via contact 1i70. This interplay between the pulse transmitting relay 1J and the storage release magnet 1AM continues until, after reaching the normal position of the storage device, the contact 1so75 restores to normal and the holding circuit for relay 1U (cf. circuit 30) is thereby interrupted.

Relay 1U is however held during the time of energization of the storage release magnet 1AM by the contact 1am74 which lies in parallel to contact 1so75. After the actuation of the pulse transmitting relay 1J, the storage release magnet 1A*m* is disconnected by the opening of the contact 1i70, this magnet in its turn disconnecting relay 1U by the opening of contact 1am74. Relay 1U, by opening its contact lu60, interrupts the energizing circuit for relay 1J and the storage release magnet 1AM.

Furthermore, via contact 1u28, the seizure circuit for the battery feed circuit SpUe is prepared (cf. circuit 1). The battery feed circuit is thus again in normal condition and can again be seized.

If however no busy signal is transmitted from the succeeding connecting device, then, as already mentioned, after the storage release of the last impulse by the opening of the contact 1so75, the circuit for obtaining a further marker (cf. circuit 9) is interrupted.

In case the desired subscriber line is idle, then during the release time of relay 1Y, voltage is applied to the 102*a* conductor by the succeeding connecting device so that relay 1D energizes via current path (cf. circuit 21). Via contact 1d80, relay 1D closes a holding circuit for itself (cf. circuit 22). Via contact 1d97, ground is applied to the outgoing 104*c* conductor independent of circuit 4:

(31) +, 1c90, 1d97, Gr88, 104*c*-conductor, . . .

At the same time, due to the opening of the contact 1d98, the holding circuit for relay 1K (cf. circuit 7) is interrupted, so that relay 1K restores with time delay.

As soon as the called subscriber answers, voltage is applied to the 103*b* conductor by the succeeding connecting device (connector). No switching operations are thereby produced in the battery feed circuit, since the energizing circuit for relay 1Z is interrupted after the restoration of relay 1K (cf. circuit 25).

After completion of the conversation, the connection is released when the calling subscriber hangs up. The pulse receiving relay 1A restores (cf. circuit 3) due to the opening of the subscriber's loop. By closing the contact 1a22 the winding of the seizure relay 1C is short-circuited and such relay 1C is thereby caused to restore with time delay. At the same time, by the opening of the contact 1a23, relay IV (cf. circuit 5) is connected. Furthermore, via contact 1a95, the circuit for energizing the storage magnet 1EM (cf. circuit 8) is closed. After actuation of relay 1V, relay 1D is held, independently of circuit 22 in the following circuit:

(32) +, 1v85, 1D, 1d79, Wi82, —.

Furthermore, ground is applied to the outgoing 104*c* conductor independently of circuit 31 via contact 1v86:

(33) +, 1v86, 104*c* conductor, . . .

After the delayed release of the seizure relay 1C, the circuit for the storage magnet 1EM is interrupted by the opening of the contact 1c90 so that the storage magnet restores. At the same time the holding circuit for relay 1D (cf. circuit 22) is interrupted, but relay 1D continues to hold itself in accordance with the circuit 32. Furthermore, after the opening of contact 1c90, ground potential would be removed from the 104*c* conductor if it were not connected in accordance with circuit 33 via contact 1v86 in order not to release the connection which has been made until the metering pulse has been transmitted. After the closing of contact 1c32, relay 1K can energize via its winding I in the circuit 28. Furthermore, a circuit for winding I of the metering relay 1Z is closed via contact 1c46:

(34) +, 1c46, 1ZI, Dr 12, 1UeIV, 103*b* conductor, . . .

Finally, after the release of relay 1C, the holding circuit for relay 1V (cf. circuit 5) is interrupted, by the opening of the contact 1c31, so that relay 1V restores with time delay. After energization of relay 1K, relay 1U is connected in accordance with circuit 29 by the closing of contact 1k71. Relay 1Z by closing its contact 1z36, applies voltage to the *z*5 conductor:

(35) —, 1z36, 1d35, *z*5 conductor, . . .

After the energization of relay 1U the storage release magnet 1AM and the pulse transmitting relay 1J are connected via contact 1u60. There now takes place exactly the same switching operations as already described in connection with the release after transmission of the busy signal. After the delayed release of relay 1V, the holding circuit for relay 1D (cf. circuit 32) is interrupted. At the same time, by the opening of contact 1v86, ground is removed from the outgoing 104*c* conductor. The succeeding connecting devices are in this manner released. As a result of the release of the succeeding connecting device, the voltage lying on the 103*b* conductor is disconnected and the metering relay 1Z releases (cf. circuit 34). It may be mentioned here that the relay 1D after energization of the metering relay 1Z was held, via contact 1z83, so that relay 1D after the release of relay 1Z also releases. By the opening of contact 1z36, the transmission of the metering impulse is terminated. As soon as relay 1D is released, relay 1K is caused to release by the opening of contact 1d25 over which, after the opening of contact 1v26, the holding circuit for winding I of relay 1K was maintained (cf. circuit 28). After relay 1K has restored, the seizure circuit (cf. circuit 1) is again prepared via contact 1k29 and the battery feed circuit can again be seized.

It may also be mentioned here that in case of long-distance calls, the long-distance marking relay 1F is caused to energize via its winding II (bottom right of FIG. 1*b*) over the 105*d* conductor. Independently of this energizing circuit, it holds itself by connecting its winding I (1FI in FIG. 1*a*) after the opening of contact 1f24 over the incoming *c*3 conductor. By closing contact 1f33 (FIG. 1*a*), the calling subscriber line is marked as being busy with a long-distance call by direct application of ground potential to the *d*4 conductor. Furthermore, a circuit for the metering relay 1Z is closed via contact 1f45 (top left in FIG. 1*b*). The metering current pulses are transmitted during the conversation by the application of voltage to the 103*b* conductor, so that relay 1Z can energize and transfer these metering pulses in circuit 35 to the charge meter of the calling subscriber. The release at the end of the conversation is the same as already described in connection with a connection to a subscriber of the same local network.

FIGS. 2*a* and 2*b* show the battery feed circuit 3*SpUe* for the called subscriber as well as the relay set associated therewith. This relay set tests the called line for busy or idle condition. Switching means are associated with the battery feed circuit for controlling the ringing of the called party and likewise the transmission of ringing tone and busy tone to the calling party. FIGS. 3*a* and 3*b* show the connector LW and the marker 4ES allocated to the connector.

Voltage is placed on the *a*120-conductor (see circuit "9") as soon as a preceding group selector has established connection with the battery feed circuit 3*SpUe* (FIGS. 2*a* and 2*b*).

If the battery feed circuit is connected with a succeeding group selector over which a connector is to be reached, the start relay of the marker allotted to such group selector will be energized. When such group selector is set, the line conductors and the control or private conductors are directly switched through and it may therefore be assumed in the following explanations, that the battery feed circuit 3SpUe (FIGS. 2*a* and 2*b*) is directly connected with the connector LW (FIGS. 3*a* and 3*b*).

Responsive to placing voltage on the conductor *a*120 in the battery feed circuit 3*SpUe*, the start relay 4A*n* in the marker 4ES (FIG. 3*a*) will energize by way of its windings I and II:

(36) +, 4*a*36, 4*c*35, 4ANII, 4*e*32, 4AN1, 4*d*31, 4*u*30, conductor *an*20, G*r* 5, 4*cg*4, conductor *a*200 (FIG. 3), 3U*e*III (FIG. 2*a*), 3*c*6, 3U*e*I, conductor *a*120, . . ., —.

It may be mentioned at this point that the supervising relay 4U (bottom left in FIG. 3*a*) is in the normal condition of the control set energized:

(37) +, 4*d*71, 4*e*72, 4*h*73, $\frac{4U}{Ko74,\ Wi75}$, —.

The capacitor K*o*74 is so dimensioned that the supervising relay 4U does not release during the interruptions of the circuit 37 incident to the setting and seizure of the marker. It releases only when the current is interrupted for an extended interval, for example, responsive to the blowing of a fuse. In such case, the start circuit is interrupted by the opening of contact 4*u*30, and the marker cannot be seized.

As soon as the start relay 4AN is energized, relay 4E will be connected by way of contact 4*an*64. Relay 4E is upon energization held over its winding I while winding II is short circuited by way of contacts 4*e*63:

(38) +, 4*an*64, 4*e*63, 4EI, —.

Closure of contact 4*e*33 and opening of contact 4*e*32 effects connection of the resistor W*i*34 in the circuit 36 in place of the winding II of the start relay 4AN. Relay 4V is energized over its windings I and II, by way of contact 4*e*82, holding itself over its winding II while its winding I is short circuited by way of contact 4*v*84:

(39) +, 4*e*82, 4*v*84, 4VII, —.

Closure of contact 4*e*81 finally starts the operation of the motor switch in the marker by energization of the field coils 4N*a* and 4N*b* (bottom right in FIG. 3*a*). These field coils 4N*a* to 4N*b* are displaced by 90°. An armature is rotatably journalled at the point of axial intersection of the field coils, such armature being rotated by the action of the magnetic fields alternately produced by the field coils. The rotary motion of the armature is transmitted by a gear to the switch shaft and therewith to the wipers 4*n*21 and 4*n*27 carried thereby. The field coils are alternately operatively connected by cam contacts 4*na*76 and 4*nb*77 which are controlled by the switch shaft.

When both field coils are energized, the armature will be held against rotation and the switch operation is thus stopped. In the illustrated position of the contacts, the field coil 4N*b* is energized:

(40) +, 4*e*81, 4*nb*77, 4N*b*, —.

The field coil 4N*b* attracts the armature, thereby causing closure of the cam contact 4*na*76 and opening of the cam contact 4*nb*77, and thus operatively connecting the field coil 4N*a*:

(41) +, 4*e*81, 4*na*76, 4N*a*, —.

The armature is now attracted by the field coil 4N*a*. The cam contact 4*na*76 is now opened again and the field coil 4N*b* is energized by way of the cam contact 4*nb*77. The wipers 4*n*21 to 4*n*27 are at the same time moved.

As soon as the wiper 4*n*21 reaches the bank contact to which is connected the connector, the testing relay 4P (upper center of FIG. 3*a*) can energize in the following circuit by way of voltage lying on the conductor *a*120:

(42) +, 4PII, 4PI, 4*v*38, 4*u*37, wiper 4*n*21, 4*cg*4, conductor *a*200 (FIG. 3), 3U*e*III (FIG. 2*a*), 3*c*6, 3U*e*I, conductor *a*120, —.

The current flowing over the conductor *a*120 is increased by the switching in of the low resistance windings of the testing relay 4P. This criterion is evaluated in the storer (FIG. 1) and the digit required for the setting of the connector to the desired decade is transmitted from the storer.

Closure of contact 4*p*78 effects energization of both field coils 4N*a* and 4N*b* of the motor switch and the operation of the switch is in this manner stopped. Relay 4A is now operatively connected over its winding II (4AII; left of center in FIG. 3*a*) by way of contact 4*p*44:

(43) +, 4*p*44, 4*d*41, 4AII, —.

Relay 4A short circuits the winding II of the testing relay 4P by way of contact 4*a*45. Moreover, opening contact 4*a*36 interrupts the holding circuit for the start relay 4AN (see circuit 36). Due to opening of contact 4*a*106 and closure of contact 4*a*57, the seizure relay 4C (lower center in FIG. 3*b*) can now energize:

(44) +, 4*a*57, W*i*105, 4C, 4*v*108, —.

The switch is held with the wipers on the corresponding bank contacts independently of the testing relay due to closure of contact 4*c*79 in parallel with contact 4*p*78 of the testing relay.

After release of the start relay 4AN, contact 4*an*64 disconnects relay 4E which releases with delay owing to the short circuit of its winding II, and opening of contact 4*e*81 disconnects the energizing circuit of the field coils 4N*a* and 4N*b*. Opening of contact 4*e*82 disconnects relay 4V which releases with delay due to the short circuit of its winding I.

The current impulses from the storer (FIG. 1) are transmitted by way of the conductor *a*120 as current interruptions during the release time of the relays 4E and 4V, respectively. Relay 4P releases impulsewise and causes by the opening of contact 4*p*44 impulsewise release of relay 4A (see circuit 43). Upon each release of relay 4A, relay 4C is short circuited over contact 4*a*106, relay 4C accordingly remaining energized (see circuit 44) during the transmission of an impulse series despite the impulsewise opening of contact 4*a*57. By way of contact 4*a*56, relay 4V which is held actuated, is energized again incident to each impulse interruption:

(45) +, 4*a*56, 4*c*55, 4*v*54, 4*e*83, 4*v*84, 4VII, —.

Upon occurrence of the first current interruption of an impulse series consisting of three impulses, relay 4R (lower right in FIG. 3*a*) is energized by way of contact 4*a*56:

(46) +, 4*a*56, 4*c*55, 4*v*54, 4*h*86, 4*s*90, 4RI, —.

Relay 4R belongs to the relay counting chain comprising the relays 4R, 4S, 4T, 4W and the auxiliary relay 4H, serving for the marking of the desired decade. When relay 4A energizes again at the conclusion of the impulse, relay 4C is according to circuit 44 switched in and relay 4R is held over its winding II:

(47) +, 4*a*57, 4*r*96, 4RII, —.

Relay 4S is now connected by way of its winding II, by the actuation of contact 4*r*99:

(48) +, 4*a*57, 4*r*99, 4*h*101, 4SII, —.

Upon receipt of the second current impulse relay 4S is held during the release of relay 4A by way of contact 4*a*56, over its winding I:

(49) +, 4*a*56, 4*c*55, 4*v*54, 4*s*91, 4SI, —.

The energizing circuit for relay 4R (see circuit 46) is interrupted by the opening of contact 4*s*90 and relay 4R consequently releases. When relay 4A energizes again at the conclusion of the current impulse, relay 4S will be held over its winding II in the circuit:

(50) +, 4*a*57, 4*r*97, 4*s*98, 4SII, —.

Relay 4H is now operatively connected by way of contact 4*s*103 over its winding II (4HII, left lower center in FIG. 3*a*):

(51) +, 4*a*57, 4*r*100, 4*s*103, 4HII, —.

Upon arrival of the third current impulse, relay 4S will be held according to circuit 49, and relay 4H is held in the circuit:

(52) +, 4*a*56, 4*c*55, 4*v*54, 4*h*85, 4*u*87, 4HI, —.

Relay 4R is connected over its winding I by way of contact 4*h*85:

(53) +, 4*a*56, 4*c*55, 4*v*54, 4*h*85, 4*t*88, 4*s*89, 4RI, —.

When relay 4A energizes again at the conclusion of the current impulse, relay 4R will be held in the circuit 47; relay 4H, winding II, is held in the circuit:

(54) +4*a*57, 4*r*99, 4*h*102, 4TI, 4HII, —.

Relay 4T energizes in this circuit. The holding circuit for the winding I of relay 4S is interrupted and this relay restores. Accordingly, at the conclusion of the third current impulse, relays 4R, 4T and the auxiliary relay 4H of the relay counting chain are energized.

After the last current impulse, the holding circuit for relay 4V (see circuit 45) is not closed and relay 4V accordingly releases with a delay. Relay 4V, by opening its contact 4*v*38 disconnects the testing relay 4P (see circuit 42). Relay 4A is held over its winding I and conductor *a*120 (see circuit 19) by way of contact 4*v*39:

(55) +, 4*a*43, 4AI, 4*v*39, 4*u*37, wiper 4*n*21, 4*cg*4, conductor *a*200, 3UeIII, 3*c*6, 3U*e*I, conductor *a*120, . . .,—.

Upon release of relay 4P, the winding II of relay 4A (see circuit 43) is disconnected.

After the delayed release of relay 4V, a circuit is closed for relay 4U*a* (winding 4U*a*I) by way of contact 4*v*49 (FIG. 3*a*). In this circuit, relay 3U arranged, in the battery feed circuit 3*Sp*U*e* (FIG. 2*b*) energizes:

(56) +, . . ., *c*122-conductor, 3*c*85, 3*c*90, 3UIII, 3*u*92, *d*203-conductor, 4*cg*6, 4*n*23-wiper, 4*v*49, 4*a*50, W*i*51, 4U*a*I, —.

Relay 4U*a*, by closing its contact 4*ua*109, closes a holding circuit over its winding II which is independent of its energizing circuit. In this circuit, the seizure relay 4C is held which would deenergize after release of relay 4V and opening of contact 4*v*108:

(57) +, 4*a*57, W*i*105, 4C, 4U*a*II, 4*ua*109, —.

Relay 4D (left lower center in FIG. 3*a*) is operatively connected by way of contact 4*ua*65:

(58) +, 4*t*69, 4D, 4*ua*65, —.

Relay 4D energizes and over its contact 4*d*62 connects the field coils 4M*a* and 4M*b* (top right in FIG. 3*a*) of the motor of the connector. The operation of this motor switch is the same as already explained in connection with the connecting switch for the marker. In the illustrated normal position, field coil 4M*a* will be energized;

(59) +, 4*d*62, 4*n*26-wiper, 4*ma*8, 4M*a*, —.

The armature of the motor switch is attracted by the field coil 4M*a*. The cam contact 4*ma*8 is now opened and the cam contact 4*mb*9 is closed, resulting in energization of field coil 4M*b*:

(60) +, 4*d*62, 4*n*26-wiper, 4*mb*9, 4M*b*, —.

The testing relay 4P is simultaneously with the switching in of the field coils connected to the test wiper *d*413 (FIG. 3*b*), over contact 4*d*42:

(61) +, 4PII, 4PI, 4*d*42, 4*n*22-wiper, *d*413-wiper, . . .

It may be mentioned at this point that voltage is connected to a main stop position HR3 (FIG. 3*b*) arranged ahead of the third decade, in the circuit:

(62) —, W*i*110, 4*s*122, 4*t*129, 4*r*125, 4*w*124, 4*ub*135, HR3, . . . .

As soon as the test wiper *d*413 reaches this marked main stop contact, test relay 4P will energize in accordance with circuit 61. Closure of contact 4*p*60 will stop the operation of the connector switch due to simultaneous energization of its field coils 4M*a* and 4M*b*. The two field coils are then interconnected in the circuit:

(63) 4M*a*, 4*n*25-wiper, 4*p*60, 4*n*27-wiper, 4M*b*.

Closure of contact 4*p*44 short circuits the winding I of relay 4A causing deenergization thereof. After release of relay 4A, instead of ground according to circuit 55, there will be ground on the *a*120-conductor of the battery feed circuit 3*Sp*U*e* in FIG. 2*a*, in the circuit:

(64) +, 4*p*44, 4*d*40, 4*v*39, 4*u*37, 4*n*21-wiper, 4*cg*4, *a*200-conductor, 3UIII, 3*c*6, 3U*e*I, *a*120-conductor, . . . ., —.

By the closure of contact 4*a*61 parallel to contact 4*p*60, both field coils 4M*a* and 4M*b* (see circuit 63), will be interconnected independently of the release of test relay 4P and will accordingly be simultaneously energized. The holding circuits for relays S, T and H of the relay counting chain (see circuits 48 and 54) will be interrupted by the opening of contact 4*a*57. The opening of this contact also interrupts the holding circuit for relay 4C and for winding II of relay 4U*a* (see circuit 57). With the exception of relay 4C the winding of which is short circuited over contact 4*a*106, the relays restore without delay. After the release of the relays of the counting chain and the relay 4U*a*, the energizing circuit for the test relay 4P (see circuits 61 and 62) is interrupted and relay 4P releases. Opening of contact 4*t*69 disconnects relay 4D (see circuit 58) and this relay restores with delay due to its slow-to-release feature.

Relay 4P by opening its contact 4*p*44 interrupts circuit 64, thereby giving to the storer a signal that the connector switch has been set. Upon opening contact 4*p*60, the field coils 4M*a* and 4M*b* of the connector are as already mentioned energized over contact 4*a*61 and the switch is thus held with its wipers set on the desired bank contacts. After the delayed release of relay 4D, the two field coils of the connector are disconnected by the opening of contact 4*d*62 and such coils are, accordingly, deenergized. Closure of contact 4*d*31 extends the start conductor *an*20 through to the start relay 4AN (see circuit 36). After release of the relay 4D, the control set is again in normal position and ready for use in connection with another call.

In the battery feed circuit, the following switching operations will take place after the energization of relay 3U (see circuit 56). An energizing circuit is closed by way of contact 3*u*16 for the toll marking relay 3F (winding 3FI, top center in FIG. 2*a*):

(65) +, 3*u*16, 3*c*17, 3FI, 3*z*22, 3*g*20, D*r*2, 3U*e*II, *b*121-conductor, —, . . . .

In incoming toll calls, during the transmission of the last current impulse series which serves for the setting to the desired subscriber station, voltage is placed in the toll transmission circuit on the *b*121-conductor and the toll marking relay can accordingly energize in the circuit 65.

Independently of its energizing circuit, relay 3U after closure of its contact 3*u*91 will hold itself over its winding III in the circuit:

(66) +, . . . ., *c*122-conductor, 3*c*85, 3*c*90, 3UIII, 3*u*91, W*i*93, —.

The energizing circuit for relay 3U (see circuit 56) is at the same time interrupted by the opening of contact 3*u*92.

The marker 4ES (FIG. 3*a*) is again placed in operation for the transmission of the last current impulse series which serves to set the connector with its wipers in engagement with the bank contacts of the desired subscriber line. The switching operations for placing the marker in operation, up to the transmission of the last current impulse correspond to those already described (see circuits 35 to 54).

It shall be assumed that the last impulse series consists again of three current impulses. The relay chain is accordingly switched as already described in connection with the switching operations incident to the receipt of the penultimate impulse series (see circuits 46 to 54). At the conclusion of the impulse series, that is, after the third impulse, relays 4R, 4H and 4T will be energized (see circuits 47, 51 and 54).

Responsive to delayed release of relay 4V, upon conclusion of the impulse series, the test relay 4P is disconnected by opening of contact 4*v*38 and relay 4A is operatively connected by closure of contact 4*v*39 (see circuits 42 and 55). Relay 4U*a* (winding 4U*a*I, center of FIG. 3*a*) is connected to the *d*203-conductor by way of contact 4*v*49 and wiper 4*n*23. However, relay 4U*a* cannot energize, since relay 3U is in the battery feed circuit energized and ground is accordingly disconnected from the *d*203-conductor due to opening of contact 3*u*92 (see FIG. 2*b*, right of center and circuit 56).

Relay 4C is disconnected by the opening of contact 4*v*108 (see circuit 44) and restores since the circuit 57 is not closed by way of contact 4*ua*109. Responsive to release of the test relay 4P, winding II of relay 4A is disconnected but relay 4A as already mentioned remains actuated over its winding I in the circuit 55. As soon as relay 4C restores, relay 4U*b* is connected over its winding II:

(67) +, 4*a*57, 4U*b*II, 4*c*104, 4*v*107, —.

The third step of each decade is marked by connecting voltage thereto over contact 4*ub*135 and the contact pyramid of the counting relay chain:

(68) —, W*i*110, 4*s*122, 4*t*129, 4*r*125, 4*w*124, 4*ub*135, step 3 of each decade.

Relay 4D is switched in over contacts 4*ub*66 and 4*t*69:

(69) +, 4*t*69, 4D, G*r*130, 4*ub*66, —.

Relay 4D closes over contact 4*d*70 a holding circuit for relay 4U*b* by way of its winding I:

(70) +, 4*d*70, 4U*b*I, 4*ub*66, —.

The field coils 4M*a* and 4M*b* of the connector are connected for operation upon closure of contact 4*d*62 (see circuits 59 and 60). As already explained, alternate energization of the two field coils will impart rotation to the connectors switch wipers. As soon as the test wiper *d*413 (FIG. 3*b*) has reached the third step in the third decade, the test relay 4P will energize in accordance with circuits 61 and 68. The circuit 61 was closed upon energization of relay 4D by way of its contact 4*d*42. Upon energization of test relay 4P the field coils 4M*a* and 4M*b* are simultaneously energized by way of contact 4*p*60 (see circuit 63). The operation of the connector switch is stopped and the wipers thereof remain on the bank contacts reached. Responsive to energization of test relay 4P, the winding I of relay 4A is short circuited by way of contacts 4*p*44 and 4*d*40, causing relay 4A to release with some delay.

Responsive to delayed release of relay 4A, ground is placed by contact 4*a*56 on the *d*203-conductor, thereby closing a circuit for the energization of the seizure relay 3C in the battery feed circuit 3S*p*U*e*:

(71) +, 4*a*56, 4*v*53, 4*ub*52, 4*d*47, 4*n*23-wiper, 4*cg*6, *d*203-conductor, 3*u*82, 3*c*84, 3CII, —.

Relay 3C is held over the *c*122-conductor independently of its energizing circuit:

(72) +, . . . , *c*122-conductor, 3CI, 3*c*83, 3CII, —.

The energizing circuit 71 is at the same time interrupted by the opening of contact 3*c*84.

In the marker of the connector, the holding circuit for the relays of the counting chain had been interrupted upon release of relay 4A due to opening of contact 4*a*57, and relays 4R, 4H and 4T are accordingly restored. Opening of contacts 4*t*129 and 4*r*125 interrupts the circuit 68, causing release of relay 4P. Opening of contact 4*t*69 interrupts the holding circuit 69 for relay 4D and this relay releases with some delay. Relay 4P upon releasing disconnects ground from the *a*200-conductor by opening its contact 4*p*44. Relay 4D, upon releasing with delay, opens its contact 4*d*62, thereby disconnecting the energizing circuit for the two field coils 4M*a* and 4M*b* of the motor of the connector. Opening of contact 4*d*70 interrupts the holding circuit 70 for relay 4U*b* which restores with delay. During the release interval of relay 4U*b*, a circuit is closed for the energization of the seizure relay 4C*g* (winding 4C*g*II, near top of FIG. 3*a*) of the connector:

(73) +, 4*a*56, 4*v*53, 4*ub*52, 4*d*48, 4*n*24-wiper, 4C*g*II, —.

The marker is responsive to delayed release of relay 5U*b* again at normal and ready for use in the extension of another call.

In the connector, the *d*203-conductor had been connected with the test wiper *c*412 (FIG. 3*b*) upon energization of the seizure relay 4C*g*. The winding I of the seizure relay 4C*g* and the winding of the line wiper control magnet 4A*d* are now connected with the *c*202-conductor by way of contact 4*cg*1. Opening of contact 4*cg*4 interrupts the start circuit 36.

In the feed transmission, the energizing circuit for the toll identifying relay (see FIG. 2*a* near top of center and also circuit 65) had been interrupted by the opening of contact 3*c*17 responsive to energization of the seizure relay 3C. Upon closure of contact 3*c*5, voltage will be on the *a*120-conductor by way of winding I of relay 3E, and relay 1D (see circuit 21) accordingly energizes in the battery feed circuit S*p*U*e* (FIG. 1) of the calling subscriber:

(74) —, 3*z*29, 3E1, 3*c*5, 3U*e*I, *a*120-conductor, 102*a*-conductor (circuit 21), . . . , 1D, —.

Relay 3E receives in this circuit insufficient current and cannot energize. The seizure relay 4C*g* of the connector is held over its winding I by way of contact 3*c*52, independently of its energizing circuit 73:

(75) +, 3c52, Wi97, c202-conductor, 4cg1, 4CgI, 4Ad, —. 4CgI, 4Ad, —.

The line wiper control magnet 4Ad receives in this circuit insufficient current and therefore cannot energize. Relay 3T is switched in over its winding III by way of contact 3c52:

(76) +, 3c52, 3u65, 3g62, 3TIII, —.

The holding circuit 66 for relay 3U is interrupted by the opening of contact 3c90. Relay 3U is after energization of relay 3T and prior to completing its delayed release, again energized over its winding I:

(77) +, 3u16, 3c18, 3UI, 3t13, —.

Responsive to energization of relay 3T, relay 3G is switched in over its winding I:

(78) +, 3c52, 3u66, 3t69, 3GI, —.

Relay 3G, by opening its contact 3g62, interrupts the holding circuit 76 for relay 3T and the latter deenergizes with delay. Actuation of contact 3g77 completes a circuit for the test relay 3P:

(79) +, 3u16, 3c18, 3g77, 3PII, 3t81, 3PI, d203-conductor, 4cg7, c412-wiper, . . . (line circuit of the called subscriber).

If the line of the called subscriber is idle, test relay 3P will energize in circuit 79 during the release interval of relay 3T and, by closing its contact 3p38, reconnects relay 3T in series with relay 3R:

(80) +, 3c52, 3TII, $\frac{3TI}{HL42}$, 3T41, 3p38, 3RI, 3z36, 3a33, —.

The thermistor HL42 which is in parallel to the winding I of relay 3T (near bottom left of FIG. 2a) has normally a high resistance and the low resistance winding II of relay 3T will accordingly receive insufficient current. When the thermistor HL42 is traversed by current, its resistance will steadily decrease until the energization of windings I and II is equalized when relay 3T is caused to release by opposed energization. It may be mentioned at this point that windings I and II are connected in opposing sense. The time constant of the thermistor limits the duration of the first ring.

The resistor Wi97 included in the circuit 75 is after closure of contact 3p95 short circuited over such contact and contact 3a96, thereby causing energization of the line wiper control magnet 4Ad (top of FIG. 3a) of the connector. The line loop in the energization circuit for relay 3A is prepared by way of contacts 3p7 and 3p12:

(81) +, 3p12, 3a10, b201-conductor, b411-wiper, subscribers' line loop, a410-wiper, a200-conductor, 3AI, 3p7, 3r8, —.

Relay 3U and test relay 3P are after closure of contact 3p54 held in the circuit:

(82) +, 3c52, 3z53, 3UII, 3PIII, 3p54, —.

Responsive to energization of the ring control relay 3R in circuit 80, voltage is disconnected from the a200-conductor by the opening of contact 3r8 and alternating ringing current RW is instead connected by way of contact 3r9 for the ringing on the called line.

During the energization of relay 3R, ringing tone FZ (bottom of FIG. 2a) is by way of contact 4r48 connected to the winding V of the transformer 3Ue:

(83) +, 3UeV, 3p47, 3r48, FZ.

The ringing tone is inductively transmitted from the winding 3UeV to the windings I and II and from there over the conductors a120 and b121 to the calling subscriber. The circuit for relay 3R is interrupted and the first ring concluded after release of relay 3T and consequent opening of contact 3t41. Relay 3R is by way of contact 3t40 connected to a ten-second ringing interrupter 4Sch (near bottom left in FIG. 2a) and thus periodically energized in 10 seconds intervals, so as to ring the called line:

(84) —, 3a33, 3z36, 3RI, 3p38, 3t40, ringing interrupter 4Sch.

Closure of contact 3t56 completes a holding circuit for relay 3P independently of circuit 82:

(85) +, 3c52, 3t56, 3ZI, 3PIII, 3p54, —.

Relay 3Z cannot energize in this circuit since it receives insufficient current by way of the low resistance winding II of relay 3U which is in accordance with circuit 82 connected in parallel to the high resistance winding of relay 3Z. Ground potential is by way of contact 3t80 directly connected to the d203-conductor thus making the called subscribers' line busy:

(86) +, 3p79, 3t80, 3a88, d203-conductor, 4cg7, c412-wiper, . . ., called subscribers' line circuit.

As soon as the called subscriber answers by removing his receiver, the line loop (see circuit 81) is closed and relay 3A energizes. Opening of contact 3a10 connects winding II of relay 3A in the circuit 81. The b201-conductor is over contact 3a11 connected with the winding IV of the transformer 3Ue (FIG. 2a) and the line conductors are thus connected through by way of the transformer. Opening of contact 3a33 interrupts the energization circuit 84 for relay 3R preventing further energization thereof. Opening of contact 3a88 connects the winding II of relay 3Z (winding 3ZII, center of FIG. 2b) in the circuit 86 and relay 3Z energizes. Opening of contact 3a96 connects the parallel disposed resistors Wi97 and Wi98 in the holding circuit 75 for relay 4Cg and the line wiper control magnet 4Ad so as to save current. Opening of contact 3z53 disconnects the winding II of relay 3U in the circuit 82, causing relay 3U to restore.

Relay 3Z is now held over its winding I (see circuit 85) independently of its energizing circuit. Upon delayed release of 3U, relay 3G is disconnected by the opening of contact 3u66 (see circuit 78). Upon release, relay 3G connects over its contact 3g20 voltage to the conductor b121:

(87) —, 3f24, 3z23, 3g20, Dr2, 3UeII, conductor b121, . . . .

The battery feed circuit is after release of relay 3G in condition to permit the two subscribers to converse with each other.

Assuming that the called subscriber is the first to restore his receiver at the completion of the conversation, whereupon the calling subscriber hangs up, ground will be disconnected from the conductor c122, interrupting the holding circuit for relay 3C (see circuit 72) and thus causing relay 3C to release. Relay 3C by opening its contact 3c52 interrupts the holding circuits for relays 3P and 3Z (see circuit 85) and for the seizure relay 4cg as well as for the line wiper control magnet 4Ad in the connector (see circuit 75). Relay 3Z is still being held over its winding II and conductor d203 until the corresponding circuit is interrupted at contact 3p79 responsive to restoration of relay 3P (see circuit 86). Upon release of relay 3Z, the feed transmission 3SpUe will be at normal and in readiness for further seizure by a preceding connection device.

However, if the calling subscriber should be the first to restore his receiver, seizure relay 3C will be caused to restore due to disconnection of ground from the conductor c122 (FIG. 2a). Upon opening contact 3c52, the test relay 3P and relay 3Z will be held operated in the circuit:

(88) +, 3*a*57, 3*z*38, 3*t*56, 3ZI, 3PIII, 3*p*54, —,

The seizure relay 4C*g* of the connector is after opening of contact 3*c*52 held operated by way of contacts 3*a*57, 3*z*58 and conductor *c*202 (see circuit 75).

When the line loop (see circuit 81) is interrupted responsive to restoration of the receiver by the called subscriber, battery feed relay 3A (windings 3AI and 3AII in FIG. 2*b*) will deenergize and will interrupt the holding circuits for relays 3P, 3Z and for the seizure relay 4C*g* of the connecter, by opening its contact 3*a*57 (bottom right in FIG. 2*a*). Upon restoration of these relays, the battery feed circuit 3S*p*U*e* and the connector 4LW will again be at rest and ready for seizure by a preceding connection device.

In the event that the called subscriber is busy, the test relay 3P cannot energize in circuit 79 within the release interval of relay 3T. After restoration of relay 3T, relay 3U will be disconnected by the opening of contact 3*t*13 (see circuit 77). Owing to its slow-to-release feature, relay 3U releases with delay and by opening its contact 3*u*66 interrupts the holding circuit for relay 3G (see circuit 78). However, relay 3G is being held operated over its winding I in the circuit:

(89) +, 3*c*52, 3*z*53, G*r*68, 3*g*72, 3*f*70, 3GI, —.

Since relay 3P is not energized, busy tone BZ (FIG. 2*a*) is over its contact 3*p*46 connected to the winding 3U*e*V of the transformer:

(90) +, 3U*e*V, 3*p*46, 3*r*44, 3*g*43, BZ.

The busy tone is inductively transmitted from the winding of the transformer 3U*e*V to the windings I and II and from there to the calling subscriber. When the calling subscriber thereupon replaces the receiver, ground potential is disconnected from conductor *c*122 and the seizure relay 3C releases, since its holding circuit 72 is interrupted. Opening of contact 3*c*52 interrupts the holding circuit for relay 3G (see circuit 78), and relay 3G restores. Upon restoration of relay 3G, the busy tone is disconnected due to opening of contact 3*g*43 (see circuit 90). The battery feed circuit is after release of relay 3G at normal and in readiness for seizure in the extension of another call.

FIGS. 4*a* and 4*b* show a further example of a connector 5LW and a marker 5ES which is common to a plurality of connectors. It shall be assumed that the connector 5LW is directly interconnected with the battery feed circuit 3S*p*U*e* shown in FIGS. 2*a*, 2*b*. However, as already mentioned, one or more group selector stages may be provided between the battery feed circuit 3S*p*U*e* and the connector 5LW.

Upon placing negative potential on the conductor *a*120 (FIG. 2*a*) of the battery feed circuit 3S*p*U*e* (see circuit 9), marker, for example, the one shown in FIGS. 4*a*, 4*b*, is started by the energization of the start relay 5AN:

(91) +, 5*c*33, 5ANII, 5*e*31, 5ANI, conductor *an*20, Gr10, 5*cg*4, conductor *a*200, 3U*e*III (FIG. 2*a*), 3*c*6, 3U*e*I, conductor *a*120, . . ., —.

Opening of contact 5*an*77, responsive to energization of the start relay 5AN, interrupts the bridge between the field coils 5N*a* and 5N*b* of the connecting switch of the control set:

(92) 5N*a*, 5*an*77, 5N*b*75, 5N*b*.

Relay 5E is operatively connected by way of contact 5*an*80:

(93) +, 5*an*80, 5E, —.

Closure of contact 5*e*30 and opening of contact 5*e*31 connects the resistor W*i*32 in the holding circuit for the start relay, replacing the winding II of the start relay 5AN (see circuit 91). Closure of contact 5*e*82 effects energization of relay 5V:

(94) +, 5*e*82, 5VII, 5VI, —.

Contact 5*v*35 connects the testing relay 5P to the wiper 5*n*21 of the connecting switch, thereby preparing the following energizing circuit for the testing relay 5P, such circuit being closed responsive to the setting of wiper 5N21 on the contact to which is connected the connector 5LW:

(95) +, 5PII, 5PI, 5*v*35, wiper 5*n*21, 5*cg*4, conductor *a*200, 3U*e*III, 3*c*6, 3U*e*I, conductor *a*120, . . ., —.

Closure of contact 5*v*79 (bottom left in FIG. 4*a*) connects the drive motor for operation. The drive motor comprises similarly to the previously noted drive motors two field coils 5N*a* and 5N*b* which are displaced by 90°, an armature being rotatably journalled at a point of intersection of the coil axes, such armature being caused to rotate by magnetic fields which are alternately produced in the field coils. The rotation of the armature is by a gear transmitted to the switch shaft and therewith to the switch wipers, 5*n*21 to 5*n*28 carried thereby. The field coils are alternately switched in by means of cam contacts 5*na*74 and 5*nb*75 which are controlled by the switch shaft. Simultaneous energization of the field coils arrests the rotation of the shaft and the wipers carried thereby. In the illustrated position of the cam contacts, the field coil 5N*b* will be energized:

(96) +, 5*v*79, 5*e*78, 5*nb*75, 5*nb*, —.

The armature is thereby attracted, imparting rotation to the switch shaft (and the wipers) and effecting opening of cam contact 5*nb*75 and closure of cam contact 5*na*74, thereby causing energization of the field coil 5N*a*:

(97) +, 5*v*79, 5*e*78, 5*na*74, 5N*a*, —.

The armature is now attracted by the magnetic field by the field coil 5N*a*, continuing rotation of the switch shaft (and the wipers), the rotation of the switch shaft opening the cam contact 5*na*74 and closing contact 5*nb*75 which again closes the circuit for the energization of the field coil 5N*b* (see circuit 96). The switch wipers are in this manner, as already described, moved respect to the bank contacts; upon reaching the bank contacts to which the connector 5LW is connected, the testing relay 5P will be energized according to circuit 95. Both field coils are responsive to closure of contact 5*p*76 energized and the rotation of the switch wipers is thus stopped. Closure of contact 5*p*46 causes energization of relay 5A over its winding II:

(98) +, 5*p*46, 5*v*45, 5AII, —.

Connection of the low resistance windings of the testing relay 5P in parallel to the high resistance winding I of the start relay 5AN results in insufficient current for the latter and such relay releases. Closure of contact 5*an*77 provides an energizing circuit for the two field coils 5N*a* and 5N*b* which is independent of the contact 5*p*76 of the testing relay (see circuit 92). Opening of contact 5*an*80 disconnects relay 5E and such relay releases with delay due to its slow-to-release characteristic.

Relay 5A energizes during the release interval of relay 5E and short circuits the winding II of the testing relay 5P by way of its contact 5*a*37 in circuit with contact 5*k*38. The seizure relay 5C is energized by way of contact 5*a*110:

(99) +, 5*a*110, 5C, W*i*112, —.

Relay 5C, responsive to energizing, opens its contact 5*c*33, thereby opening the energizing circuit for the start relay 5AN (see circuit 91). An energizing circuit for relay 5U and for the relay 3U disposed in the battery feed circuit 3S*p*U*e* is closed by way of contact 5*c*49:

(100) +, . . ., conductor c122, 3c85, 3c90, 3UIII, 3u92, conductor d203, 5cg8, wiper 5n23, 5UI, 5e47, 5c49, Wi50, —.

Relay 3U arranged in the battery feed circuit remains operated in its own holding circuit (see circuit 66).

Opening of contact 3u92 interrupts the energizing circuit for relay 3U and for relay 5U in the setting set 5ES. Relay 5U remains operated by way of its winding II:

(101) +, 5u142, 5UII, 5c143, Wi144, —.

Opening of contact 5e78, responsive to delayed release of relay 5E disconnects the energizing circuit for both field coils 5Na and 5Nb (see circuits 96 and 92). Opening of contact 5e82 interrupts the energizing circuit for relay 5V (see circuit 94), such relay releasing with delay due to the short circuit of its winding II over contact 5e81.

The impulses transmitted as voltage interruptions (see circuit 95) from the input circuit (not shown) arrive during the release of the relays 5E and 5V, respectively. The testing relay 5P releases impulsewise according to the number of impulses, thereby causing by the opening of its contact 5p46 impulsewise release of relay 5A (see circuit 98). The energizing circuit for the seizure relay 5C (see circuit 99) is interrupted at each opening of contact 5a110, but relay 5C remains operated during an impulse series due to its slow-to-release characteristic which is supported by the short circuiting of its winding over contact 5a111. Relay 5V is energized at each release of relay 5A over contact 5a95 thereof:

(102) +, 5c96, 5a95, 5v89, Gr83, 5e81, 5VI, —.

Relay 5V remains operated during the impulse series by the slow-to-release characteristic imparted thereto by short circuiting its winding II.

It shall be assumed that the first impulse series (tens digit) consists of three impulses. Responsive to first release of relay 5A, contact 5a95 will operatively connect relay 5R of the relay counting chain comprising the relays 5R, 5S, 5T, 5W and 5X:

(103) +, 5c96, 5a95, 5v89, 5t92, 5s90, 5RI, —.

When relay 5A energizes again at the conclusion of the first impulse, relay 5R will be held operated by way of its own contact 5r97 and contact 5a95 which is now closed:

(104) +, 5c96, 5a94, 5r97, 5RII, —.

Relay 5S can energize by way of contact 5r102:

(105) +, 5c96, 5a94, 5r102, 5t100, 5SII, —.

When relay 5A releases responsive to receipt of the second impulse, relay 5S will be held operated by way of contact 5a95:

(106) +, 5c96, 5a95, 5v89, 5u88, 5s86, 5SI, —.

The energizing circuit for relay 5R (see circuit 103) is interrupted by the opening of contact 5s90 and relay 5R restores. Relay 5A energizes again at the conclusion of the second impulse, closing its contact 5a94, and relay 5S will accordingly be held operated by way of its contact 5s99 in the circuit:

(107) +, 5c96, 5a94, 5r98, 5s99, 5SII, —.

Relay 5T energizes by way of contact 5s105:

(108) +, 5c96, 5a94, 5r103, 5s105, 5TII, —.

Upon arrival of the third impulse, relay 5S, after release of relay 5A will be held operated in the circuit 106. Relay 5R energizes by way of contact 5t93 while relay 5T is held over its winding I in parallel to the winding I of the relay 5R:

(109) +, 5c96, 5a95, 5v89, 5u88, 5t93, $\frac{5s91,\ 5RI}{5TI}$ —,

When relay 5A energizes again at the conclusion of the impulse, closing its contact 5a94, relay 5R will be held operated in the circuit 104. Relay 5T is held by way of its contact 5t101 in the circuit:

(110) +, 5c96, 5a94, 5r102, 5t101, 5w104, 5TII, —.

The holding circuit for relay 5S is interrupted and such relay restores. Since no further impulses are received, relay 5V releases with delay at the conclusion of the third impulse, thereby interrupting the holding circuit for the testing relay 5P (see circuit 95) by opening its contact 5v35. Relay 5A is held operated over closed contact 5v34, its winding I and voltage on the conductor a200, in the circuit:

(111) +, 5AI, 5a36, 5v34, wiper 5n21, 5cg4, conductor a200, 3UeIII, 3c6, 3UeI, conductor a120, . . ., —.

Opening of contact 5v45 disconnects the energizing circuit for the winding II of relay 5A (see circuit 98). The testing relay 5P is operatively connected by way of contact 5v58 and the test wiper d304:

(112) +, 5PII, 5PI, Wi59, 5v58, 5u57, wiper 5n25, wiper d304, . . . .

Relay 5K is energized by way of contact 5v108:

(113) +, 5c96, 5a94, 5v108, 5u107, 5K, —.

Upon energization of relay 5K, contact 5k38 removes the short circuit for the winding II of the testing relay 5P and this relay can accordingly energize without delay. Due to closure of contact 5k121, relay 5K will be held operated independently of its energizing circuit:

(114) +, 5c96, 5k121, 5K, —.

Relay 5D is energized over its winding II by way of contact 5k113:

(115) +, 5a110, 5k113, 5DIII, 5DII, —.

Responsive to energization of relay 5D, its winding III is short circuited by way of its contact 5d114 to make it slow to release. Contact 5d73 connects the motor (coils 5Ma and 5Mb, top left of FIG. 4b) of the connector for operation in the same manner as already described with reference to the motor of the connecting switch of the marker. In the illustrated normal position, the field coil 5Ma will be energized by way of contact 5d73 and wiper 4n27 of the connecting switch:

(116) +, 5d73, wiper 5n27, 5ma11, 5Ma, —.

The magnetic field produced by the field coil 5Ma causes attraction of the armature to rotate the shaft carrying the wipers, whereby cam contact 5ma11 is opened while cam contact 5mb12 is closed to energize field coil 5Mb:

(117) +, 5d73, wiper 5n27, 5mb12, 5Mb, —.

The armature is now attracted by the action of the magnetic field produced by the field coil 5Mb, continuing rotation of the switch shaft with its wipers a300–d304, thus effecting opening of cam contact 5mb12 and closing of cam contact 5ma11, whereby the field coil 5Ma is energized again to attract the armature. The switch wipers are in this manner rotated until the test wiper d304 reaches in the following circuit the main stop HR3 when the testing relay 5P energizes according to circuit 112 and also in circuit:

(118) —, Wi122, 5c123, 5s124, 5r126, 5x128, HR3, —.

Closure of contact 5p65 effects energization of both field coils 5Ma and 5Mb of the motor drive and further rotation of the wipers is thus stopped:

(119) 5Ma, wiper 5n26, 5c60, 5k64, 5p65, 5c63, wiper 4n28, 5Mb, —.

Winding I of relay 5A is short circuited by way of contact 5p46:

(120) +, 5AI, 5*u*43, 5*v*44, 5*p*46, +.

Relay 5A accordingly deenergizes. Opening of contact 5*a*36 interrupts circuit 111 causing release of relay 1U in the battery feed circuit transmission S*p*U*e* (FIG. 1), relay 1U, as explained in connection with FIG. 1 preparing the transmission of the next impulse series. Upon opening contact 5*a*70, relay 5G is energized over its winding II by way of contact 5*a*71 which is now closed:

(121) +, 5*d*73, 5*a*71, 5GII, —.

Relay 5G is thereupon held operated by way of its contact 5*g*72 independently of contact 5*a*71:

(122) +, 5*d*73, 5*g*72, 5GII, —.

Opening of contact 5*a*110 causes release of relays 5C and 5D (see circuits 99 and 115), such relays releasing with delay due to the short circuits on their windings. Opening of contact 5*a*94 (bottom left in FIG. 4*b*) interrupts the holding circuit for counting chain relays 5R and 5T (circuits 104 and 110), such relays restoring and interrupting the energizing circuit for the testing relay 5P by opening contact 5*r*126 (see circuits 112 and 118), thereby effecting release of relay 5P.

Responsive to delayed release of relay 5D, relay 5G is caused to release due to opening of contact 5*d*73 (see circuit 122), such contact also interrupting the drive motor field coils 5M*a* and M*b* (see circuits 116 and 117). Upon delayed release of relay 5C, contact 5*c*96 opens the holding circuit for relay 5K (see circuit 114) and contact 5*c*143 opens the holding circuit for relay 5U (see circuit 101) causing both relays to restore. The circuit for the start relay 5AN (see circuit 91) is closed by way of contact 5*c*33 and the setting set is accordingly placed in readiness for further use.

After the decade setting to the main stop HR3 has been completed, the marker 5ES can again be taken into use for the units setting in the same manner as already explained (see circuits 91 to 99). The switch-over relay 5U cannot energize responsive to energization of the seizure relay 5C, since its energization circuit is interrupted in the feed transmission 3S*p*U*e* by the opening of contact 3*u*92.

The impulses transmitted from the input circuit by interruption of the circuit 95 are received in the marker during the release interval of relay 5E and 5V, respectively. As already explained, the testing relay 5P deenergizes impulsewise, opening by its contact 5*p*46 the holding circuit for relay 5A (see circuit 98) and thus causing relay 5A to release similarly impulsewise. Relay 5V is energized over contact 5*a*95 incident to each release of relay 5A (see circuit 102) so as to hold it operated during the receipt of the corresponding impulse series. The holding circuit for relay 5C (see circuit 99) is interrupted at contact 5*a*110 (bottom center of FIG. 4*b*) incident to each release of relay 5A. However, due to its slow-to-release feature, relay 5C does not restore during the impulsing. Upon first release of relay 5A, relay 5D is energized over its winding I by way of contact 5*a*95:

(123) +, 5*c*96, 5*a*95, 5*v*89, 5*u*87, 5DI, —.

Upon conclusion of the impulse, relay 5D is held operated over its winding II:

(124) +, 5*c*96, 5*a*94, 5*v*109, 5*d*115, 5*d*114, 5DII, —.

Winding III of relay 5D is short circuited by way of contact 5*d*114, causing relay 5D to restore delayed upon interruption of its holding circuit. The drive motor of the connector is now operatively connected by way of contact 5*d*73. In the illustrated positions of the cam contacts 5*ma*11 and 5*mb*12, the field coil 5M*a* will be energized according to circuit 116. Since relay 5A has released during the first impulse, a circuit is now closed for the field coil 5M*b*:

(125) +, 5*d*73, wiper 5*n*27, 5*ma*11, wiper 5*n*26, 5*c*60, 5*k*62, 5*a*66, 5GI, 5*c*63, wiper 5*n*28, 5MB, —.

Winding I of relay 5G will be energized in this circuit. However, relay 5G cannot be actuated since it is according to circuit 121 oppositely energized over its winding II as is apparent from the designations for the beginning and end of the winding.

When relay 5A is again operatively actuated at the conclusion of the impulse, opening of contact 5*a*66 will interrupt the energizing circuit for the field coil 5M*b* and the armature will accordingly be attracted by the field of the field coil 5M*a*. Cam contact 5*ma*11 is thereupon opened and cam contact 5*mb*12 is closed, thus causing energization of the field coil 5M*b* according to circuit 117 while the field coil 5M*a* is placed in the circuit:

(126) +, 5*d*73, 5*a*70, 5*k*69, 5*g*67, 5*c*60, wiper 5*n*26, 5M*a*, —.

Responsive to release of relay 5A upon receipt of the second impulse, contact 5*a*70 will be opened to interrupt the energizing circuit for the field coil 5M*a* (see circuit 126). The field coil 5M*a* is however energized by way of closed contact 5*a*66:

(127) +, 5*d*73, wiper 5*n*27, 5*nb*12, wiper 5*n*28, 5*c*63, 5GI, 5*a*66, 5*k*62, 5*c*60, wiper 5*n*26, 5M*a*, —.

Since windings I and II of relay 5G are now energized in identical sense (see circuits 121 and 127), relay 5G energizes and closes over its contact 5*g*72 a holding circuit for itself (see circuit 122) which is independent of its energizing circuit. Responsive to release of relay 5A at the conclusion of the impulse, contact 5*a*66 will be opened to interrupt the energizing circuit for the field coil 5M*a* (see circuit 127) causing attraction of the motor armature by the field produced by the field coil 5M*b*. Cam contact 5*mb*12 is thereupon opened and cam contact 5*ma*11 is closed, again causing energization of the field coil 5M*a* according to circuit 116, while field coil 5M*b* is energized in the circuit:

(128) +, 5*d*73, 5*a*70, 5*k*69, 5*g*68, 5*c*63, wiper 5*n*28, 5M*b*, —.

Upon receipt of the third impulse, the energizing circuit for the field coil 5M*b* is interrupted by the opening of contact 5*a*70. The field coil 5M*b* is however energized according to circuit 125 by way of contact 5*a*66 which is now closed. The windings I and II of relay 5G are according to circuit 121 and 125 oppositely energized and relay G5 restores. When relay 5A energizes again at the conclusion of the third impulse, opening of contact 5*a*66 will interrupt the circuit 125 of the field coil 5M*b* and the motor armature will now be attracted by the action of the magnetic field of field coil 5M*a*, rotating the wipers by one step to the third bank contacts. The cam contact 5*ma*11 is at the same time opened and cam contact 5*mb*12 is closed and, accordingly, the field coil 5M*b* is energized according to circuit 117 while the field coil 5M*a* is energized according to circuit 126.

It shall be assumed that this second impulse series (units digit) for the setting of the connector wipers within the selected decade, on the bank contacts of the desired called line, consists again of three impulses. Relay 5V will restore with delay at the conclusion of the third impulse, interrupting by opening of its contact 5*v*35 the holding circuit for relay 5P (see circuit 95) and closing at the same time over its contact 5*v*34 a holding circuit for winding I of relay 5A by way of the conductor 120 (see circuit 111). Winding II of relay 5A (see circuit 98) is disconnected by opening of contact 5*v*45. A test circuit is completed by way of contact 5*v*58 and wiper *d*304 of the connector LW, to ascertain whether the line that had been reached is an individual subscriber line or the line of a private branch exchange:

(129) +, 5*k*38, 5*a*37, 5PI, W*i*59, 5*v*58, 5*u*56, 5*d*54, G*r*53, wiper 5*n*25, wiper *d*304, . . . .

The holding circuit for relay 5D (see circuit 124) is interrupted by the opening of contact 5*v*109, relay 5D releasing with delay due to the short circuit of its winding III. Relay 5T can now energize by way of contact 5*v*108:

(130) +, 5*c*96, 5*a*94, 5*v*108, 5*u*106, 5TII, —.

A circuit for the marking of the first line of private branch exchange lines is now closed by way of contact 5*t*145 of relay 5T:

(131) —, 5K, 5*k*120, 5*t*145, MA*a*, . . . .

If the corresponding line is not the first line of a private branch exchange but an individual subscriber line, testing relay 5P will be operatively connected upon delayed release of relay 5D and consequent closing of contact 5*d*55:

(132) +, 5*k*38, 5*a*37, 5PI, W*i*59, 5*v*58, 5*u*56, 5*d*55, 5*e*48, 5*c*49, W*i*50, —.

Opening of contact 5*d*73 effects disconnection of the field coils 5M*a* and 5M*b* (see circuits 126 and 117). Testing relay 5P closes over its contact 5*p*46 a circuit for the energization of the seizure relay 3C of the preceding battery feed circuit S*p*U*e*:

(133) +, 5*p*46, 5*v*44, 5*u*42, 5*t*41, wiper 5*n*23, 5*cg*8, conductor *d*203, 3*u*82, 3*c*84, 3CII, —.

Relay 3C energizes and holds itself operated by way of its contact 3*c*83 independently of its energizing circuit 72. Opening of contact 3*c*6 interrupts the holding circuit for relay 5A of the control set (circuit 111) and relay 5A accordingly restores and, by opening its contact 5*a*110, interrupts the holding circuit for the seizure relay 5C (see circuit 99) which restores with delay due to its slow-to-release characteristic which is supported by the short circuit about its winding by way of contact 5*a*111. Relay 5T is disconnected by opening of the contact 5*a*94 (see circuit 130) and releases, thereby interrupting the marking circuit for the first line of a private branch exchange (see circuit 131). An energizing circuit for the seizure relay 5C*g* (winding 5C*g*II, left of center near top of FIG. 4*a*) of the connector is now closed by way of contact 5*t*40:

(134) +, 5*p*46, 5*v*44, 5*u*42, 5*t*40, 5*c*39, wiper 5*n*22, 5C*g*II, —.

The seizure relay 5C*g* of the connector holds itself operated independently of its energizing circuit, in a holding circuit over its winding I and the conductor *c*202 extending to the battery feed circuit:

(135) +, 3*c*52, W*i*97, conductor *c*202, 5*cg*5, 5C*g*I, 5A*d*, —.

The line wiper control magnet 5A*d* does not receive sufficient current in this circuit and cannot energize. Responsive to energization of the relay 3T and relay 3G in the battery feed circuit 3S*p*U*e* (see circuits 74 to 78) a circuit is closed for the testing relay 3P:

(136) +, . . . ., 3*u*16, 3*c*18, 3*g*77, 3PII, 3*t*81, 3PI, conductor *d*203, 5*cg*9, connector wiper *c*302, . . . ., —.

If the called line is idle, the testing relay 3P can energize and thereby introduce the operations already described in connection with FIGS. 2*a* to 3*b*, to effect connection of ringing current to the called line (see circuits 80 to 90).

The testing relay 5P is caused to release upon delayed restoration of the seizure relay 5C*g* of the control set responsive to opening of contact 5*c*49 (see circuit 132). Opening of contact 5*c*39 interrupts the energization circuit for the seizure relay 5C*g* of the connector (see circuit 134) but such relay remains actuated according to circuit 135. The energization circuit for the start relay AN is closed at contact 5*c*33, placing the control set in position for being taken into use by another preceding connection device in the extension of another call.

The operations will now be explained which are effected in case the line reached by the connector is the first line of a private branch exchange. In such case, relay 5K energizes according to circuits 129 and 131 responsive to the energization of relay 5T (see circuit 130). The low resistance winding I of the testing relay 5P, which is connected according to circuit 129, receives insufficient current due to the high resistance winding of relay 5K, and cannot energize. Relay 5K remains independently of its energizing circuit operated over its contact 5*k*121 according to circuit 114, with simultaneous interruption of circuit 131 for the marking of the first private branch exchange line due to the opening of contact 5*k*120. Closure of contact 5*k*51 effects connection of the windings I and II of the testing relay 5P to the test wiper *c*302:

(137) +, 5PII, 5PI, W*i*59, 5*v*58, 5*u*56, 5*d*54, G*r*52, 5*k*51, wiper 5*n*24, wiper *c*302, . . . ., —.

The testing relay can in this circuit energize responsive to the setting of the connector test wiper c302 to an idle private branch exchange line. The short circuit about the winding II of the testing relay P5 had been removed by the opening of contact 5*k*38. Opening of contact 5*k*69 interrupts the energizing circuit for the field coil 5M*a* (see circuit 126). The connector is thus conditioned for free hunting of its wipers *a*300 to *d*304 with respect to the bank contacts of the private branch exchange lines. Relay 5D is held operated over its winding II by way of contact 5*k*113, responsive to actuation of relay 5K (see circuit 115). As soon as the test wiper *c*302 finds an idle line, the testing relay 5P will be energized in the circuit 137 and the hunting operation of the connector will be stopped. However, if no line is found idle, testing relay 5P will be energized when the connector wipers reach the last private branch exchange line, such energization being effected according to circuit 129 and the circuit:

(138) —, W*i*144, 5*c*143, MA*e*, . . . .

Contact 5*p*65 is actuated responsive to energization of the testing relay 5P to connect the two field coils 5M*a* and 5M*b* according to circuit 119, causing simultaneous energization of these field coils to stop the hunting operation of the connector. The seizure relay 3C of the battery feed circuit is energized by way of contact 5*p*46 (see circuit 133). The subsequent operations are effected in the sequence as already explained following the tracing of circuit 133.

Changes may be made within the scope and spirit of the appended claims which define what is believed to be new and desired to have protected by Letters Patent.

We claim:

1. In a telephone system having connectors each provided with control relay means operatively connected therewith and having marker devices which are respectively common to a plurality of connectors, for controlling the operation thereof in the extension of calls from calling to called lines, control relay means for the respective marker devices, means for first connecting with a connector, involved in the extension of a call, a marker device for the setting thereof according to the impulses representing the tens digit of a desired called line, means for thereupon releasing said marker device, means for thereafter again connecting a marker device with said connector for the setting thereof in accordance with impulses representing the units digit of the called line, a circuit arrangement for deriving sequential evaluation of the impulses representing said tens and units digits, respectively, said circuit arrangement comprising a test circuit, means controlled by said test circuit and effective responsive to the first connection of said marker device with said connector, for transmitting to the marker control relay means an electrical criterion signifying the setting of said connector in accordance with the impulses representing said tens digit, means for storing said electrical criterion in said marker control relay means, and means controlled by said stored electrical criterion upon subsequent connection of a marker device with said connector for effecting operation thereof in accordance with the impulses representing the units digit of the called line.

2. A circuit arrangement according to claim 1, comprising a battery feed circuit containing a storage relay, a switch over relay contained in said marker device, and a slow-to-release relay included in said marker device which relay is energized during the transmission of impulses corresponding to the tens digit, said slow-to-release relay deenergizing with delay at the conclusion of the impulses corresponding to the tens digit and closing an energizing circuit for said storage relay and for said switch-over relay.

3. A circuit arrangement according to claim 2, comprising means controlled by said storage relay upon energization thereof for closing a holding circuit for itself while simultaneously opening its energizing circuit.

4. A circuit arrangement according to claim 2, comprising a seizure relay for said marker device, and means controlled by said switch-over relay upon energization therefor for opening its energization circuit and for closing a holding circuit for itself over a second winding in series with said seizure relay.

5. A circuit arrangement according to claim 2, comprising a start relay for said connector, and means controlled by said switch-over relay for governing the operation of said start relay.

6. A circuit arrangement according to claim 5, comprising a testing relay included in said marker device, a control relay for governing the holding circuit of said switch-over relay and said seizure relay, said testing relay being upon actuation thereof responsive to setting of said connector in accordance with the tens digit effective to cause release of said control relay, said marker device being released and disconnected from said connector upon release of said switch-over relay and said seizure relay.

7. A circuit arrangement according to claim 2, comprising a control relay which is energized during the transmission of the units digit impulse series, and means governed by said storage relay in said battery feed circuit for opening the energizing circuit of said switch-over relay to prevent after release of said control relay operative actuation thereof incident to subsequent connection of a marker device to said connector for receiving the current impulses corresponding to the units digit.

8. A circuit arrangement according to claim 7, comprising a second switch-over relay, and means depending upon the interruption of the holding circuit of the seizure relay under control of the relay which is energized during the transmission of the units digit for operatively connecting said second switch-over relay.

9. A circuit arrangement according to claim 1, comprising a battery feed circuit associated with said connector, means operative after completion of the tens selection operation for storing in said battery feed device an electrical criterion signifying completion of such tens selection operation, a relay counting chain arranged in said marker device which is operatively responsive to incoming tens and units impulse series, contacts of the relays of said counting chain forming a contact pyramid, a first switch-over relay for switching the outlets of said contact pyramid to marking banks contacts arranged ahead of the respective decade bank contacts of said connector, and a second switch-over relay for switching the outlets of said contact pyramid to the bank contacts of individual lines arranged within the respective decades.

10. A circuit arrangement according to claim 9, wherein contacts of the first switch-over relay are operative to switch part of the outlets of said contact pyramid to said decade marking bank contacts, and wherein the remaining outlets of the contact pyramid are connected with the remaining decade marking bank contacts by way of resting contacts of said second switch-over relay.

11. A circuit arrangement according to claim 9, wherein contacts of the second switch-over relay are operative to switch part of the outlets of said contact pyramid to bank contacts of individual lines arranged within the respective decade bank contacts, and wherein the remaining outlets are connected with the bank contacts remaining individual lines by way of resting contacts of the first switch-over relay.

12. A circuit arrangement according to claim 6, comprising means effective after setting of said connector in accordance with the units digit for causing said control relay which is disconnected by said testing relay to close a circuit for the seizure relay of the battery feed circuit.

13. A circuit arrangement according to claim 12, comprising a seizure relay for said conductor, means for disconnecting the start relay responsive to release of said testing relay, said start relay effecting disconnection of the second switch-over relay and closing during delayed release of such switch-over relay an energizing circuit for said conductor seizure relay.

14. A circuit arrangement according to claim 13, comprising a seizure relay for said battery feed circuit, means controlled by such seizure relay for closing the connector seizure relay, a holding circuit which is independent of the marker device cooperating with the connector.

15. A circuit arrangement according to claim 1, comprising means operative upon seizure of a marker device for closing a testing circuit extending to the control relay set of the connector for ascertaining the storing of the tens selection setting of the connector in said control relay means.

16. A circuit arrangement according to claim 15, comprising a battery feed circuit, means operative responsive to the operation of said testing circuit for causing energization of a storing relay disposed in the battery feed circuit and also energization of a switch-over relay disposed in the marker device which switch-over relay is operative to place a relay counting chain for the tens digit impulses under control of an impulse receiving relay.

17. A circuit arrangement according to claim 16, comprising means governed by a contact of said switch-over relay for preparing a circuit for a marking relay which controls the stopping circuit of the connector, and means for completing said prepared circuit by way of the contact of a relay which releases with delay at the conclusion of an impulse series.

18. A circuit arrangement according to claim 17, comprising means for preparing by way of a contact of said marking relay a circuit for the stopping of the drive motor of the connector which circuit is closed responsive to actuation of said testing relay, and means controlled by a further contact of said marking relay for energizing a relay operative to connect said drive motor.

19. A circuit arrangement according to claim 15, comprising a switch-over relay, means effective in the absence of operative actuation of said testing circuit for energizing by way of a contact of the switch-over relay, in non-energized condition thereof, the start relay for said drive motor, and means for connecting by way of contacts of the marking relay, in non-energized condition thereof, switching means in the drive circuit for the individual line selection of said connector.

20. A circuit arrangement according to claim 19, comprising an auxiliary relay for closing responsive to individual line setting a circuit for a slow-to-release relay which restores at the conclusion of the units digit impulse series, means controlled over a contact of said auxiliary relay for preparing a marking circuit for the first lines of private branch exchange subscribers, and means for closing said prepared marking circuit over a wiper of the connector responsive to setting thereof to a private branch exchange line.

21. A circuit arrangement according to claim 20, comprising means operative responsive to the setting of the connector on bank contacts of a private branch exchange line for energizing the marking relay which is disposed in the circuit for marking the private branch exchange lines, contact means controlled by the energized marking relay for disconnecting the switching means for the individual line control of the connector, and further contact means controlled by said marking relay for connecting to the motor circuit a testing relay which energizes when the connector establishes connection with an idle line.

22. A circuit arrangement according to claim 21, wherein said testing relay of the marker device energizes when the connector establishes connection respectively with an individual subscriber line or an idle private branch exchange line or the last line in a group of private branch exchange lines, energization of said testing relay being effective to stop the operation of said connector by the actuation of a contact of said testing relay and being further effective to close by way of another contact thereof a circuit previously prepared over a contact of said auxiliary relay for the transmisison of an electrical criterion signifying the completion of the setting operations of the connector.

References Cited in the file of this patent

UNITED STATES PATENTS

| | | |
|---|---|---|
| 2,722,567 | Davison et al. | Nov. 1, 1955 |
| 2,750,448 | Mercer | June 12, 1956 |
| 2,761,901 | Lundkvist | Sept. 4, 1956 |
| 2,764,635 | Lesigne | Sept. 25, 1956 |
| 2,813,929 | Oberman | Nov. 19, 1957 |
| 2,816,171 | Geels et al. | Dec. 10, 1957 |
| 2,890,286 | Flood | June 9, 1959 |
| 2,905,764 | Blashfield | Sept. 22, 1959 |
| 2,912,510 | Den Hertog et al. | Nov. 10, 1959 |